(12) United States Patent
Zhang et al.

(10) Patent No.: US 11,388,476 B2
(45) Date of Patent: Jul. 12, 2022

(54) BLOCK PARTITIONING METHOD AND APPARATUS

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/239,614

(22) Filed: Apr. 25, 2021

(65) Prior Publication Data

US 2021/0250649 A1    Aug. 12, 2021

Related U.S. Application Data

(63) Continuation of application No. PCT/IB2019/059218, filed on Oct. 28, 2019.

(30) Foreign Application Priority Data

Oct. 26, 2018  (CN) .................. PCT/CN2018/111990

(51) Int. Cl.
*H04N 21/454* (2011.01)
*H04N 21/845* (2011.01)
(Continued)

(52) U.S. Cl.
CPC .......... *H04N 21/4542* (2013.01); *G06T 9/40* (2013.01); *H04N 19/102* (2014.11);
(Continued)

(58) Field of Classification Search
CPC ........... H04N 21/4542; H04N 21/8455; H04N 19/102; H04N 19/119; H04N 19/122;
(Continued)

(56) References Cited

U.S. PATENT DOCUMENTS

2018/0063528 A1    3/2018  An et al.
2018/0213264 A1    7/2018  Zhang et al.
2019/0387226 A1*  12/2019  Lee .................. H04N 19/70

FOREIGN PATENT DOCUMENTS

CN      104519362 B    10/2017
EP       1771008 A2     4/2007
(Continued)

OTHER PUBLICATIONS

Bross, Benjamin. "Versatile Video Coding (Draft 1)" Joint Video Experts Team (JVET) of ITU-T SG 16 WP 3 and ISO/IEC JTC 1/SC 29/WG 11, 10th Meeting: San Diego, US, Apr. 10-20, 2018, Document JVET-J1001, 2018.

(Continued)

*Primary Examiner* — Allen C Wong
(74) *Attorney, Agent, or Firm* — Perkins Coie LLP

(57) ABSTRACT

A method of visual media processing includes performing, based at least in part on a rule for using an extended quadtree (EQT) partitioning process, a conversion between a current block of visual media data and a corresponding coded representation of the visual media data, wherein the EQT partitioning process includes partitioning a given block into exactly four sub-blocks, at least one of which has a size different from half of a width of the given block times half of a height of the given block; and wherein the rule specifies that if the rule is used for partitioning the current block, then each subblock is further split in accordance with a binary tree (BT) partitioning process or a second EQT partitioning process, and further wherein, both the BT process and the (Continued)

second EQT partitioning process have tree depths that meet a pre-defined relationship.

20 Claims, 23 Drawing Sheets

(51) Int. Cl.
    *H04N 19/96*     (2014.01)
    *H04N 19/119*     (2014.01)
    *H04N 19/176*     (2014.01)
    *H04N 19/13*     (2014.01)
    *H04N 19/70*     (2014.01)
    *H04N 19/122*     (2014.01)
    *H04N 19/102*     (2014.01)
    *H04N 19/174*     (2014.01)
    *G06T 9/40*     (2006.01)

(52) U.S. Cl.
    CPC ......... *H04N 19/119* (2014.11); *H04N 19/122* (2014.11); *H04N 19/13* (2014.11); *H04N 19/174* (2014.11); *H04N 19/176* (2014.11); *H04N 19/70* (2014.11); *H04N 19/96* (2014.11); *H04N 21/8455* (2013.01)

(58) Field of Classification Search
    CPC .... H04N 19/13; H04N 19/174; H04N 19/176; H04N 19/70; H04N 19/96; G06T 9/40
    USPC ..................................................... 375/240.02
    See application file for complete search history.

(56) References Cited

FOREIGN PATENT DOCUMENTS

| | | |
|---|---|---|
| EP | 3383045 A1 | 10/2018 |
| WO | 2016091161 A1 | 6/2016 |
| WO | 2018088805 A1 | 5/2018 |
| WO | 2019234640 A1 | 12/2019 |

OTHER PUBLICATIONS

Chen et al. "Algorithm Description of Joint Exploration Test Model 7 (JEM 7)," Joint Video Exploration Team (JVET) of ITU-T SG 16 WP 3 and iSO/IEC JTC 1/SC 29/WG 11 7th Meeting, Torino, IT, Jul. 13-21, 2017, document JVET-G1001, 2017.

CHEN et al. "Algorithm Description for Versatile Video Coding and Test Model 1 (VTM 1)," Joint Video Experts Team (JVET) of ITU SG 16 WP 3 and ISO/IEC JTC 1/SC 29/WG 11, 10th Meeting, San Diego, US, Apr. 10-20, 2018, document JVET-J1002, 2018.

Gao et al. "CE1-2.0.11: Picture Boundary Handling," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0287, 2018.

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Ma et al. "Description of Core Experiment: Partitioning," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J1021, 2018.

Misra et al. "Description of SDR and HDR Video Coding Technology Proposal by Sharp and Foxconn," Joint Video Exploration Team (JVET) of ITU-T SG WP 3 and ISO/IEC JTC 1/SC 29/WG 11, 10th Meeting, San Diego, US, Apr. 10-20, 2018, document JVET-J0026, 2018.

Sullivan et al. "Overview of the High Efficiency Video Coding (HEVC) Standard," IEEE Transactions on Circuits and Systems for Video Technology, Dec. 2012, 22(12):1649-1668.

Wang et al. "Extended Quad-Tree Partitioning for Future Video Coding," 2019 Data Compression Conference (DCC), IEEE, Mar. 26, 2019, pp. 300-309.

Wu et al. "Description of SDR Video Coding Technology Proposal by University of Science and Technology China, Peking University, Harbin Institute of Technology and Wuhan University (IEEE 1857. 10 Study Group)," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0032, 2018.

International Search Report and Written Opinion from PCT/IB2019/059215 dated Feb. 4, 2020 (19 pages).

International Search Report and Written Opinion from PCT/IB2019/059216 dated Mar. 30, 2020 (23 pages).

International Search Report and Written Opinion from PCT/IB2019/059218 dated Apr. 9, 2020 (24 pages).

International Search Report and Written Opinion from PCT/IB2019/059219 dated Feb. 6, 2020 (24 pages).

\* cited by examiner

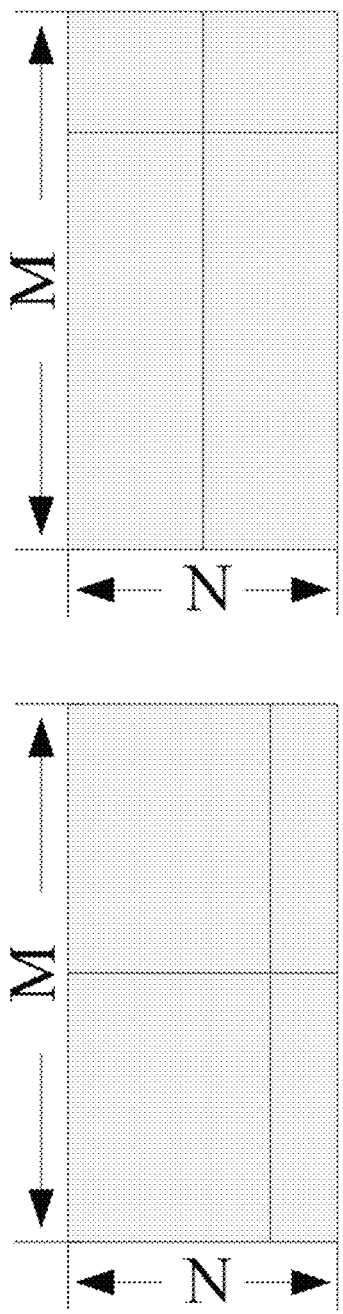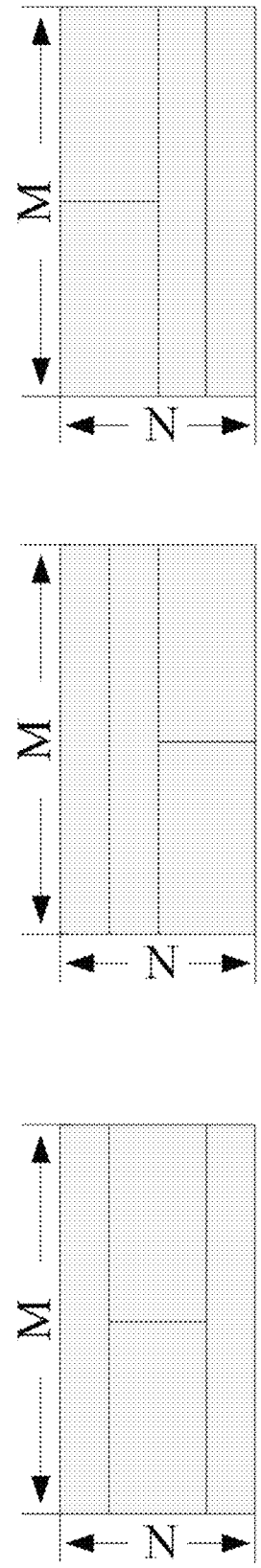
FIG. 7E
FIG. 7F
FIG. 7G

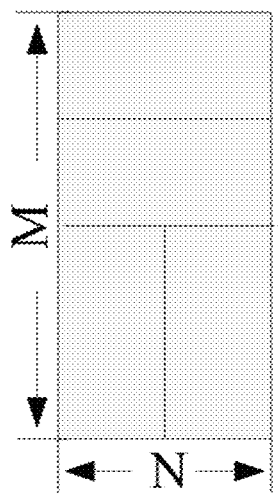
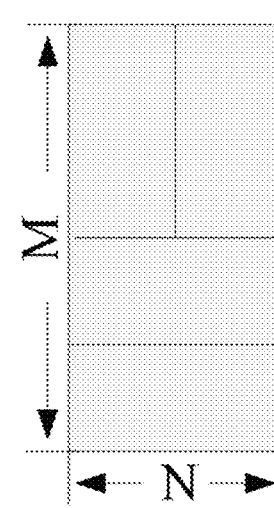
FIG. 7H
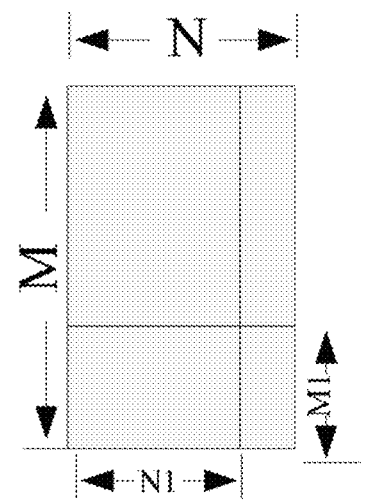
FIG. 7I
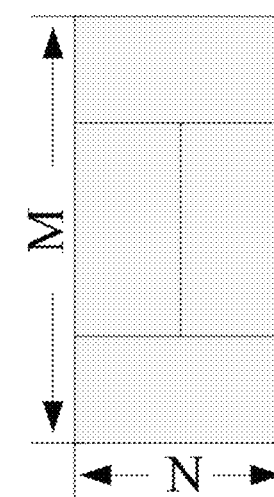

BLOCK PARTITIONING METHOD AND APPARATUS

CROSS REFERENCE TO RELATED APPLICATIONS

This application is a continuation of International Application No. PCT/IB2019/059218, filed on Oct. 28, 2019, which claims the priority to and benefits of International Patent Application No. PCT/CN2018/111990, filed on Oct. 26, 2018. All the aforementioned patent applications are hereby incorporated by reference in their entireties.

TECHNICAL FIELD

This patent document relates to video coding and decoding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

In one aspect, a method of visual media processing includes performing, based at least in part on a rule for using an extended quadtree (EQT) partitioning process, a conversion between a current block of visual media data and a corresponding coded representation of the visual media data, wherein the EQT partitioning process includes partitioning a given block into exactly four sub-blocks, at least one of which has a size different from half of a width of the given block times half of a height of the given block; and wherein the rule specifies that if the rule is used for partitioning the current block, then each subblock is further split in accordance with a binary tree (BT) partitioning process or a second EQT partitioning process, and further wherein, both the BT process and the second EQT partitioning process have tree depths that meet a pre-defined relationship.

In another aspect, a method of visual media processing includes performing, based at least in part on a rule for using a BT partitioning process, a conversion between a current block of visual media data and a corresponding coded representation of the visual media data, wherein the BT partitioning process includes partitioning a given block into exactly two sub-blocks; and wherein the rule specifies that if the rule is used for partitioning the current block, then each subblock is further split in accordance with another binary tree (BT) partitioning process and/or an EQT partitioning process, wherein the EQT partitioning process includes partitioning a given block into exactly four sub-blocks, at least one of which has a size different from half of a width of the given block times half of a height of the given block, and further wherein, both the BT process and the EQT partitioning process have depths that meet a pre-defined relationship.

In an yet another aspect, a method of visual media processing includes performing, based at least in part on a rule for using an extended quadtree (EQT) partitioning process, a conversion between a current block of visual media data and a corresponding coded representation of the visual media data, wherein the EQT partitioning process includes partitioning a given block into exactly four sub-blocks, at least one of which has a size different from half of a width of the given block times half of a height of the given block; and wherein the rule specifies that if the rule is used for partitioning the current block, then a same allowed root node size is used for all blocks in a tile or a slice or a picture or a sequence of pictures as that used for binary tree partitioning.

In a further aspect, a method of visual media processing includes performing, based at least in part on a rule for using an EQT partitioning process or a BT partitioning process, a conversion between a current block of visual media data and a corresponding coded representation of the visual media data, wherein the EQT partitioning process includes partitioning a given block into exactly four sub-blocks, at least one of which has a size different from half of a width of the given block times half of a height of the given block; wherein the BT partitioning process includes partitioning a given block into exactly two sub-blocks; and wherein the coded representation is configured to include a first field indicative of partitioning of the current block between the EQT partitioning or the BT partitioning process, and a second field indicative of a splitting direction for the current block between horizontal and vertical directions.

In a yet further aspect, a method of visual media processing includes performing, based at least in part on a rule for using a EQT partitioning process or a BT partitioning process, a conversion between a current block of visual media data and a corresponding coded representation of the visual media data, wherein the EQT partitioning process includes partitioning a given block into exactly two sub-blocks, at least one of which has a size different from half of a width of the given block times half of a height of the given block; wherein the BT partitioning process includes partitioning a given block into exactly two sub-blocks; wherein the coded representation is configured to include a first field indicative of partitioning of the current block between the EQT partitioning or the BT partitioning process, and a second field indicative of a splitting direction for the current block between horizontal and vertical directions, and wherein the first field or the second field are generated by using a context coding based at least upon a depth information of one or more neighboring blocks or a depth information of a current block.

In another aspect, a method of visual media processing includes performing, using a rule for using an extended quadtree (EQT) partitioning process, a conversion between a current block of visual media data and a corresponding coded representation of the visual media data, wherein the EQT partitioning process includes partitioning a given block into exactly four sub-blocks, at least one of which has a size different from half of width of the given block times half of a height of the given block; and wherein the rule allows applying the EQT partitioning process for the current block based on a width or a height of the current block.

In a yet another aspect, a method of visual media processing includes performing, using a rule for using an extended quadtree (EQT) partitioning process, a conversion between a current block of visual media data and a corresponding bitstream representation of the visual media data, wherein the EQT partitioning process includes partitioning a given block into exactly four sub-blocks, at least one of which has a size different from half of width of the given block times half of a height of the given block; and wherein the rule allows the EQT partitioning process for the current block based on a position of the current block.

In a further aspect, a method of visual media processing includes performing, using a rule for using an extended quadtree (EQT) partitioning process, a conversion between a current block of visual media data and a corresponding coded representation of the visual media data, wherein the EQT partitioning process includes partitioning a given block into exactly four sub-blocks, at least one of which has a size different from half of width of the given block times half of a height of the given block; and wherein, if the rule disallows the EQT partitioning process for the current block, then corresponding syntax elements associated with the EQT partitioning process are omitted from the coded representation.

In a yet further aspect, a method of visual media processing includes performing, using a rule for using an extended quadtree (EQT) partitioning process, a conversion between a current block of visual media data and a corresponding coded representation of the block, wherein the EQT partitioning process includes partitioning a given block into exactly four sub-blocks, at least one of which has a size different from half of width of the given block times half of a height of the given block; and wherein, regardless if the rule allows or disallows the EQT partitioning process for the current block, then corresponding syntax elements associated with the EQT partitioning process are signaled in the coded representation.

In yet another representative aspect, the various techniques described herein may be embodied as a computer program product stored on a non-transitory computer readable media. The computer program product includes program code for carrying out the methods described herein.

In yet another example aspect, a video encoder apparatus may implement a method as described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 7A-7K show examples of block partitioning.

DETAILED DESCRIPTION

To improve compression ratio of video, researchers are continually looking for new techniques by which to encode video. The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for improving readability and do not limit the scope of techniques and embodiments described in each section only to that section. Furthermore, while certain terms from various existing video codec standards are used, the disclosed technologies are not limited only to these video standards or their successors and are applicable to other video codec standards. Furthermore, in some cases, techniques are disclosed using corresponding coding steps, and it will be understood that, at a decoder, the corresponding decoding steps in reverse order will be performed. In addition, coding may also be used to perform transcoding in which a video is represented from one coded representation (e.g., one bitrate) to another coded representation (e.g., a different bitrate).

1 Brief Overview

This document is related to image/video coding, especially on the partition structure, i.e., how to split one Coding Tree Unit (CTU) into multiple Coding Units (CUs) and how to fasten encoders to select the best partition structure. It may be applied to the existing video coding standard like HEVC, or the standard (Versatile Video Coding) to be finalized. It may be also applicable to future video coding standards or video codec.

2 Introduction to Video Coding and Decoding Technologies

Figure 1:
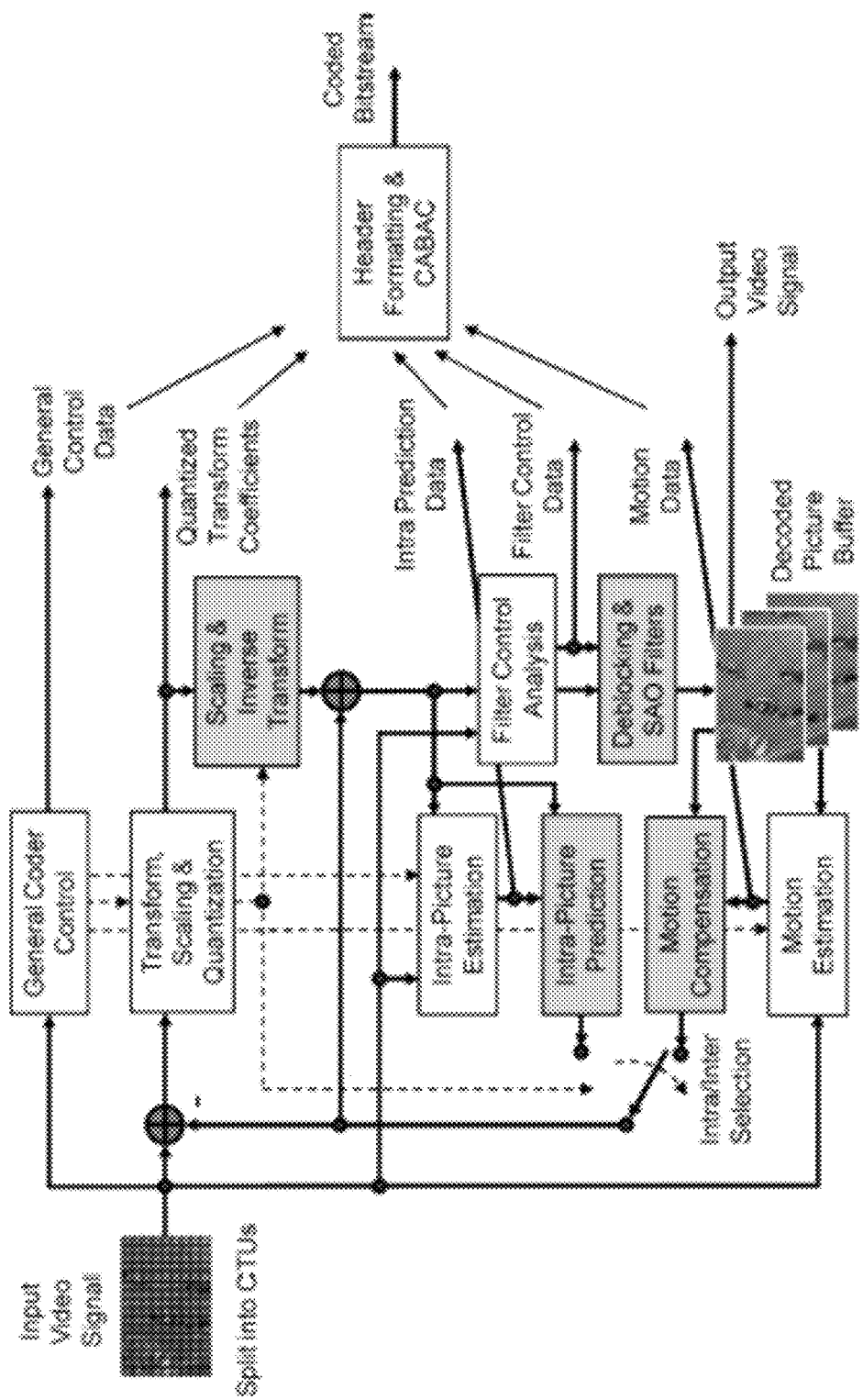
FIG. 1 shows a block diagram for an example implementation of video encoding and decoding.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted in FIG. 1.

2.1 Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (e.g., see FIG. 5A). Only one motion vector (MV) per sub-macroblock partition is allowed.

Figure 2:
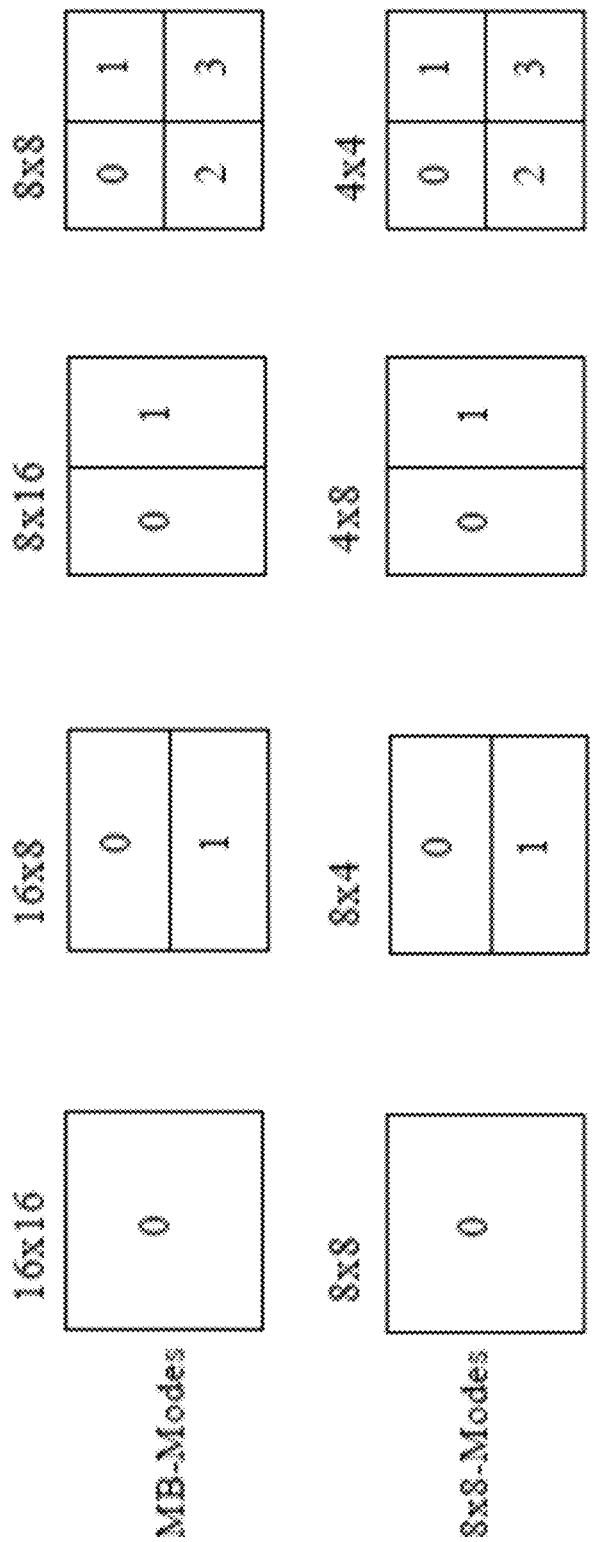
FIG. 2 shows an example of macroblock (MB) partitioning according to the H.264/Audio Video Codec (AVC) standard.

FIG. 2 shows an example of MB partitions in H.264/AVC.

2.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

Figure 3:
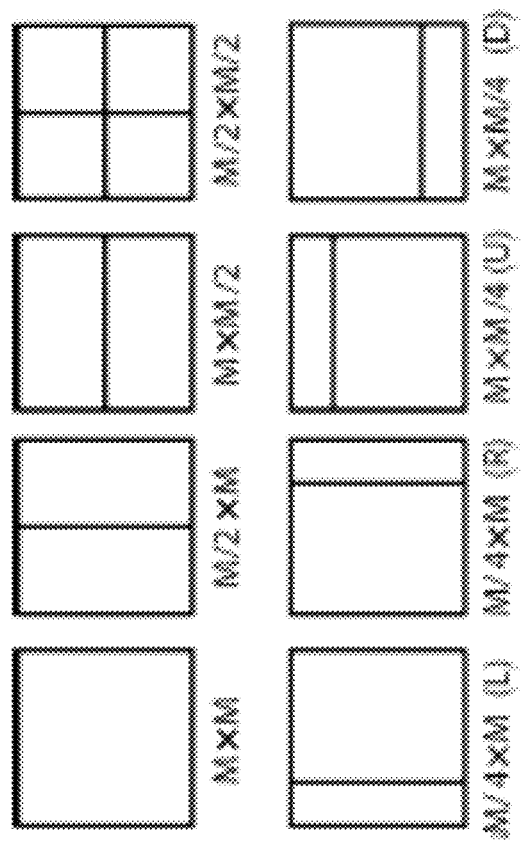
FIG. 3 shows an example of modes for splitting a coding block (CB) into prediction blocks (PBs) subject to certain size constraints. E.g., intra-pictures are allowed to use only M×M and M/2×M/2 sizes.

FIG. 3 shows an example of modes for splitting a coding block (CB) into prediction blocks (PBs) subject to certain size constraints. E.g., intra-pictures are allowed to use only M×M and M/2×M/2 sizes.

Figure 4B:
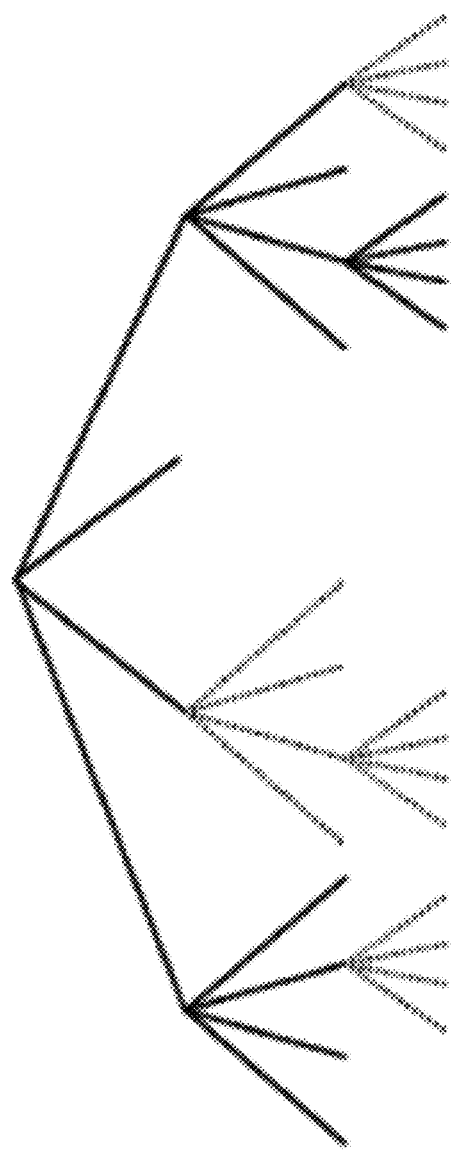
FIG. 4B shows the quadtree corresponding to the CTB of FIG. 4A.
Figure 4A:
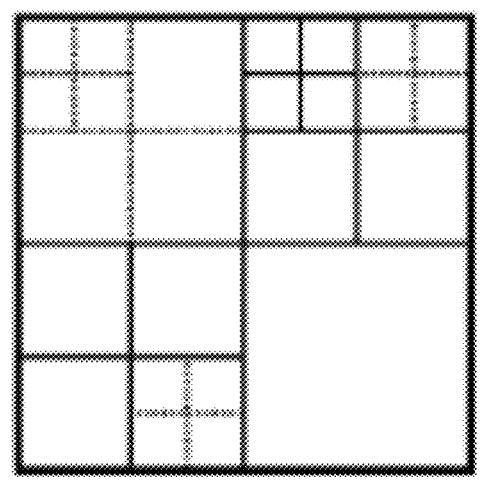
FIG. 4A shows CTB with partitioning.

FIGS. 4A and 4B show examples of subdivisions of a coding tree block (CTB) into CBs and transform blocks (TBs). In these drawings, solid lines indicate CB boundaries and dashed lines indicate TB boundaries. For example, FIG. 4A shows CTB with partitioning. FIG. 4B shows the quadtree corresponding to the CTB of FIG. 4A.

2.3 Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.3.1 QTBT Block Partitioning Structure

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape.

Figure 5B:
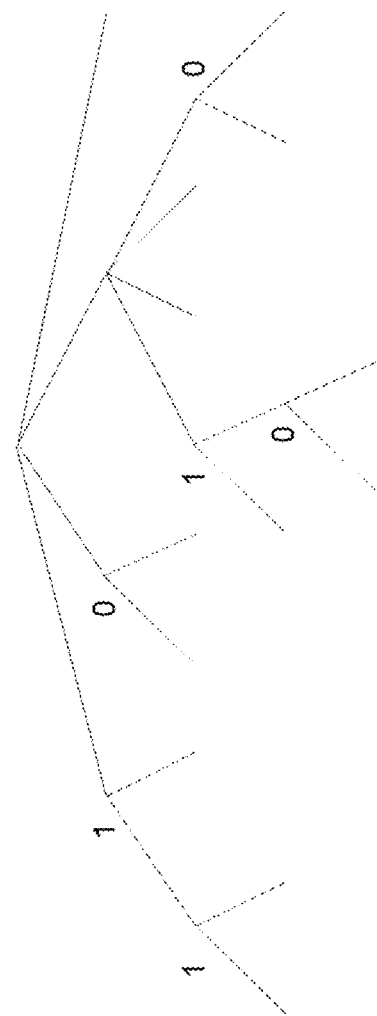
FIGS. 5A and 5B illustrate an example of a Quad Tree Binary Tree (QTBT) structure.
Figure 5A:
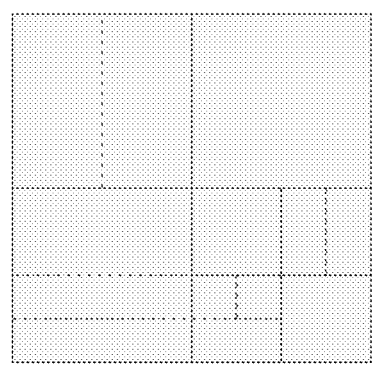

FIGS. 5A and 5B illustrate an example of a Quad Tree Binary Tree (QTBT) structure. As shown in FIGS. 5A and 5B, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree, and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

In each splitting (i.e., non-leaf) node of the binary tree, for example as shown in FIG. 5B, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.4 Triple-Tree for VVC

In some implementations, tree types other than quad-tree and binary-tree are supported. In the implementation, two more triple tree (TT) partitions, i.e., horizontal and vertical center-side triple-trees are introduced, as shown in FIG. 6 (d) and (e).

Figure 6:
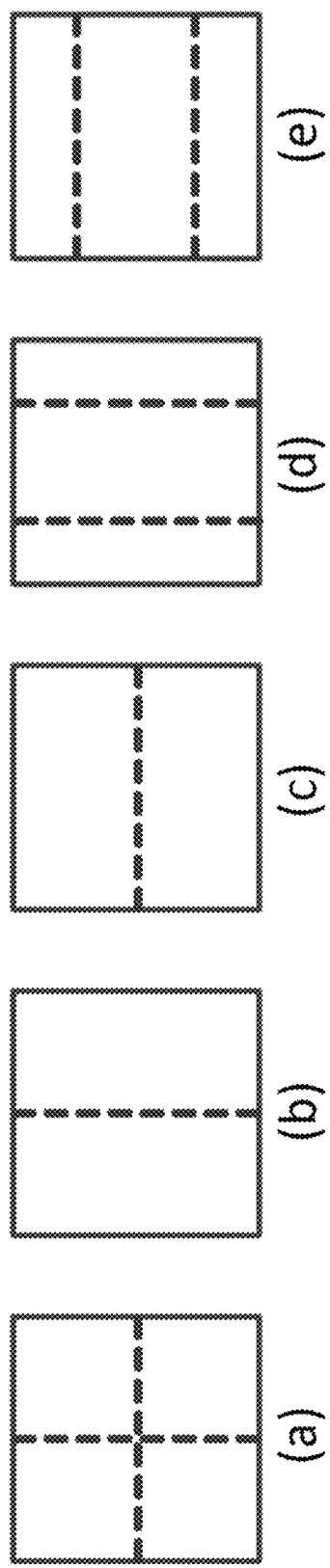
FIG. 6 shows various examples of block partitioning.

FIG. 6 shows example of block partitioning patterns. (a) quad-tree partitioning (b) vertical binary-tree partitioning (c) horizontal binary-tree partitioning (d) vertical center-side triple-tree partitioning (e) horizontal center-side triple-tree partitioning In some implementations, there can be two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.5 Extended Quad Tree

An extended quad tree (EQT) partitioning structure corresponding to a block partitioning process including an extended quad tree partitioning process for the block of video data, wherein the extended quad partitioning structure represents partitioning the block of video data into final sub-blocks, and when the extended quad tree partitioning process decides to apply extended quad tree partition to one given block, said one given block is always split into four sub-blocks; decoding the final sub-blocks based on the video bitstream; and decoding the block of video data based on the final sub-blocks decoded according to the EQT structure derived. EQT is presented in the above-captioned patent application, incorporated by reference herein.

The EQT partitioning process can be applied to a given block recursively to generate EQT leaf nodes. Alternatively, when EQT is applied to a certain block, for each of the sub-block due to EQT, it may further be split into BT and/or QT and/or TT and/or EQT and/or other kinds of partition trees.

In one example, EQT and QT may share the same depth increment process and same restrictions of leaf node sizes. In this case, the partitioning of one node could be implicitly terminated when the size of the node reaches a minimum allowed quad tree leaf node size or EQT depth with the node reaches a maximum allowed quad tree depth.

Alternatively, EQT and QT may share different depth increment process and/or restrictions of leaf node sizes. The partitioning of one node by EQT is implicitly terminated when the size of the node reaches a minimum allowed EQT leaf node size or EQT depth associated with the node reaches a maximum allowed EQT depth. In one example, furthermore, the EQT depth and/or the minimum allowed EQT leaf node sizes may be signaled in sequences parameter set (SPS), and/or picture parameter set (PPS), and/or slice header, and/or CTU, and/or regions, and/or tiles, and/or CUs.

Figure 7B:
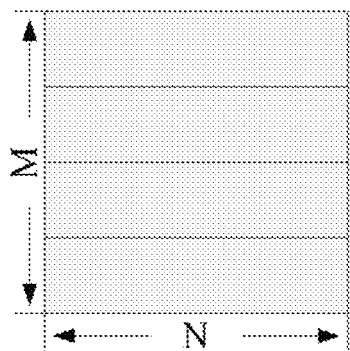
Figure 7A:
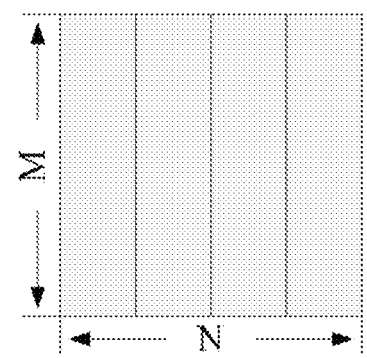

Instead of using the current quad tree partition applied to a square block, for a block with M×N (M and N are non-zero positive integer values, either equal or unequal) size, in EQT, one block may be split equally into four partitions, such as M/4×N or M×N/4 (examples are depicted in FIG. 7A and FIG. 7B or split equally into four partitions and the partition size is dependent on the maximum and minimum values of M and N. In one example, one 4×32 block may be split into four 4×8 sub-blocks while a 32×4 block may be split into four 8×4 sub-blocks.

Instead of using the current quad tree partition applied to a square block, for a block with M×N (M and N are non-zero positive integer values, either equal or unequal) size, in EQT, one block may be split unequally into four partitions, such as two partitions are with size equal to (M*w0/w)× (N*h0/h) and the other two are with (M*(w−w0)/w)×(N* (h−h0)/h).

Figure 7D:
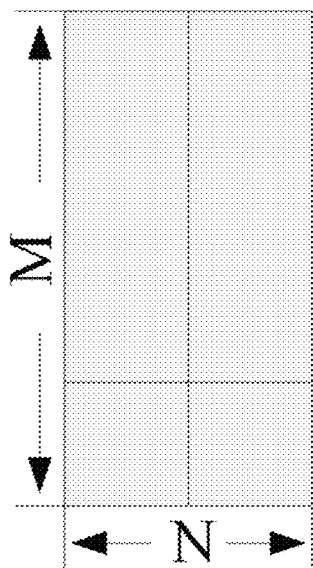
Figure 7C:
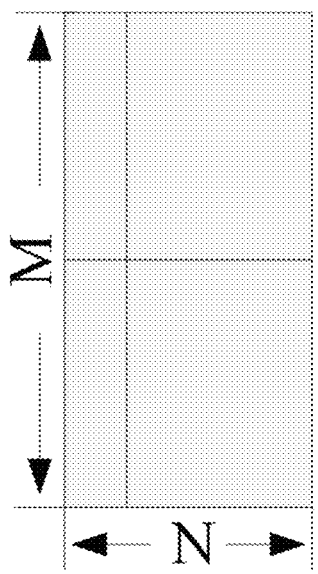

For example, w0 and w may be equal to 1 and 2, respectively that is the width is reduced by half while the height could use other ratios instead of 2:1 to get the sub-blocks. Examples for this case are depicted in FIG. 7C and FIG. 7E. Alternatively, h0 and h may be equal to 1 and 2, respectively, that is the height is reduced by half while the width could use other ratios instead of 2:1. Examples for this case are depicted in FIG. 7D and FIG. 7F.

FIGS. 7G and 7H show two alternative examples of quad tree partitioning.

FIG. 7I shows a more general case of quad tree partitioning with different shapes of partitions.

Figure 7K:
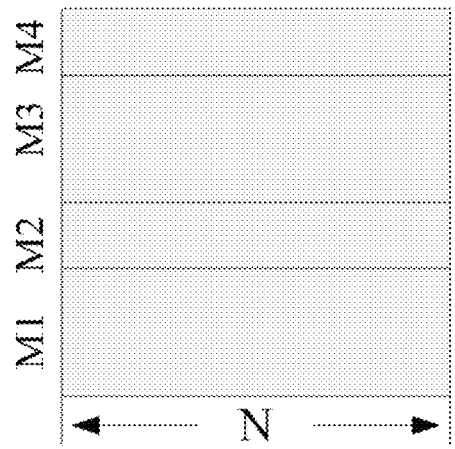
Figure 7J:
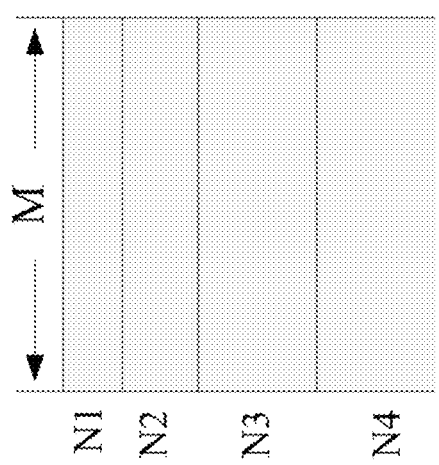
Figure 8B:
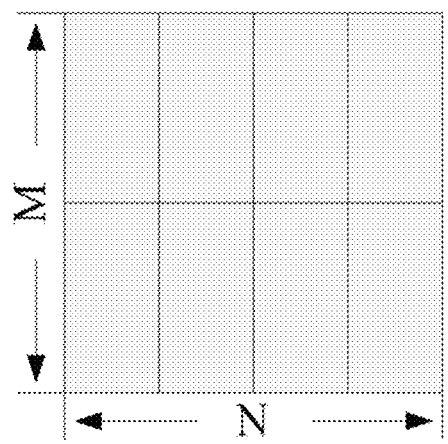
FIG. 8A-8D show examples of block partitioning.
Figure 8A:
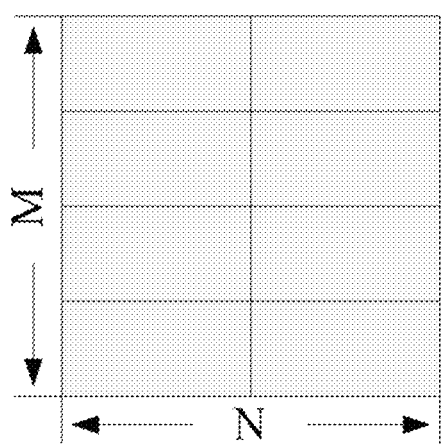
Figure 8D:
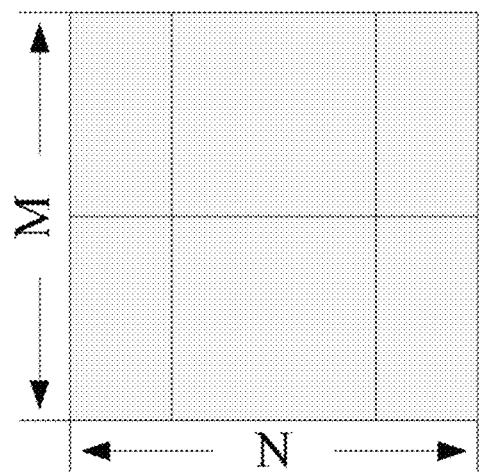
Figure 8C:
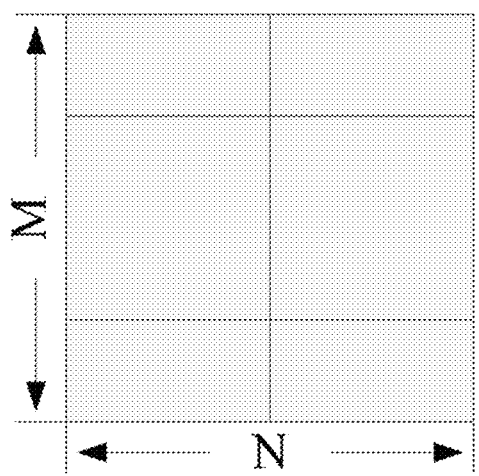

FIGS. 7J and 7K show general examples of FIGS. 7A and 7B.

FIG. 7C shows a sub-block width fixed to be M/2, height equal to N/4 or 3N/4, smaller for top two partitions (d) sub-block height fixed to be N/2, width equal to M/4 or 3M/4, smaller for left two partitions.

FIG. 7E shows a sub-block width fixed to be M/2, height equal to 3N/4 or N/4, smaller for bottom two partitions. FIG. 7F shows a sub-block height fixed to be N/2, width equal to 3M/4 or M/4, smaller for right two partitions. The following example dimensions are shown FIG. 7G M×N/4 and M/2× N/2; FIG. 7H: N×M/4 and N/2×M/2, FIG. 7I: M1×N1, (M−M1)×N1, M1×(N−N1) and (M−M1)×(N−N1); FIG. 7J M×N1, M×N2, M×N3 and M×N4, where and N1+N2+N3+N4=N, FIG. 7K: M1×N, M2×N, M3×N and M4×N where M1+M2+M3+M4=M.

A flexible tree (FT) partitioning structure corresponding to a block partitioning process including an FT partitioning process for the block of video data, wherein the FT partitioning structure represents partitioning the block of video data into final sub-blocks, and when FT partitioning process decides to apply FT partition to one given block, said one given block is split into K sub-blocks wherein K could be larger than 4; decoding the final sub-blocks based on the video bitstream; and decoding the block of video data based on the final sub-blocks decoded according to the FT structure derived.

The FT partitioning process can be applied to a given block recursively to generate FT tree leaf nodes. The partitioning of one node is implicitly terminated when the node reaches a minimum allowed FT leaf node size or FT depth associated with the node reaches a maximum allowed FT depth.

Alternatively, when FT is applied to a certain block, for each of the sub-block due to FT, it may further be split into BT, and/or QT, and/or EQT, and/or TT, and/or other kinds of partition trees.

Alternatively, furthermore, the FT depth or the minimum allowed FT leaf node sizes or the minimum allowed partition size for FT may be signaled in sequences parameter set (SPS), and/or picture parameter set (PPS), and/or slice header, and/or CTU, and/or regions, and/or tiles, and/or CUs.

Similar to the proposed EQT, all of the sub-blocks due to FT partitions may be with the same size; alternatively, the sizes of different sub-blocks may be different.

In one example, K is equal to 6 or 8. Some examples are depicted in FIG. 8A-8D, which show examples of FT partitions (K=6 in FIGS. 8C and 8D, or 8 in FIGS. 8A and 8B)

For the TT, the restriction of splitting along either horizontal or vertical may be removed.

Figure 9B:
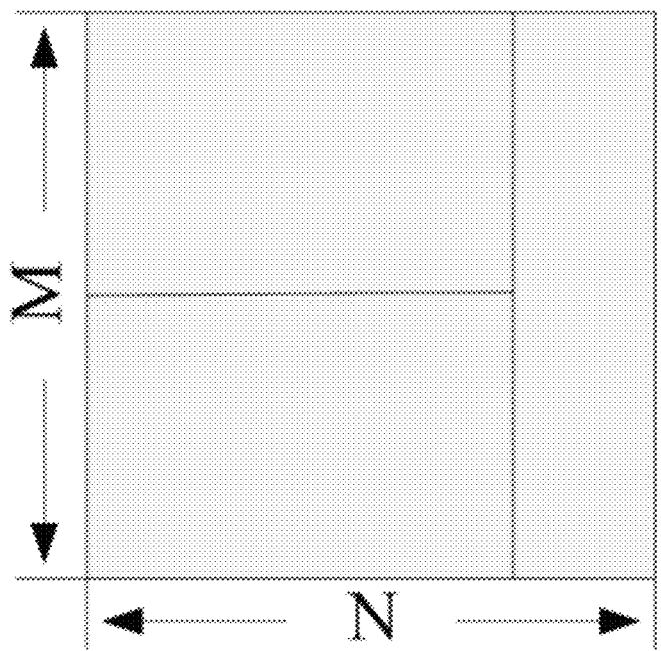
FIG. 9A-9B shows an example of generalized triple tree partitioning (GTT).
Figure 9A:
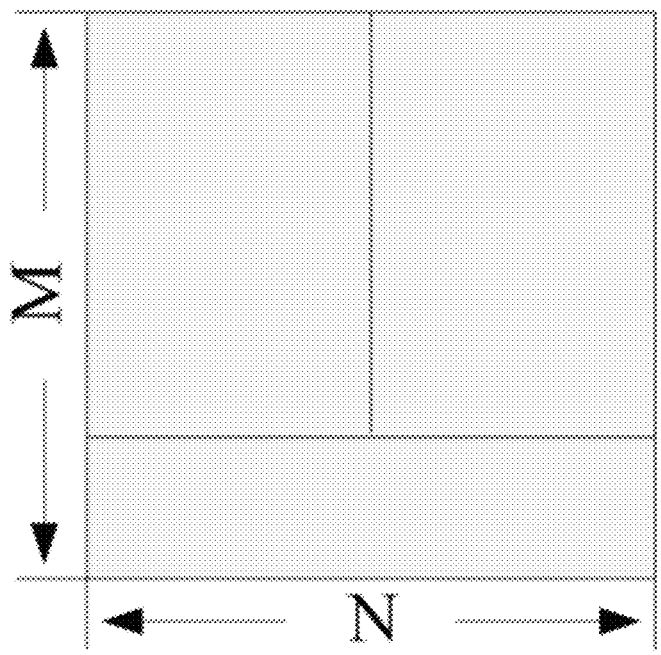

In one example, a generalized TT (GTT) partition pattern may be defined as splitting for both horizontal and vertical. Examples are shown in FIGS. 9A and 9B.

The proposed methods may be applied under certain conditions. In other words, when the condition(s) are not satisfied, there is no need to signal the partition types.

Alternatively, the proposed methods may be used to replace the existing partition tree types. Alternatively, furthermore, the proposed methods may be only used as a replacement under certain conditions.

In one example, the condition may include the picture and/or slice types; and/or block sizes; and/or the coded modes; and/or whether one block exceeds picture/slice/tile boundary.

In one example, the proposed EQT may be treated in the same way as QT. In this case, when it is indicated that the partition tree type is QT, more flags/indications of the detailed quad-tree partition patterns may be further signaled. Alternatively, EQT may be treated as additional partition patterns.

In one example, the signaling of partitioning methods of EQT or FT or GTT may be conditional, i.e. one or some EQP/FT/GTT partitioning methods may not be used in some cases, and the bits corresponding to signal these partitioning methods are not signaled.

2.6 Border Handling

In some embodiments, a boundary handling method is proposed to Versatile Video Coding (VVC). A similar method is also adopted into AVS-3.0.

Figure 10:
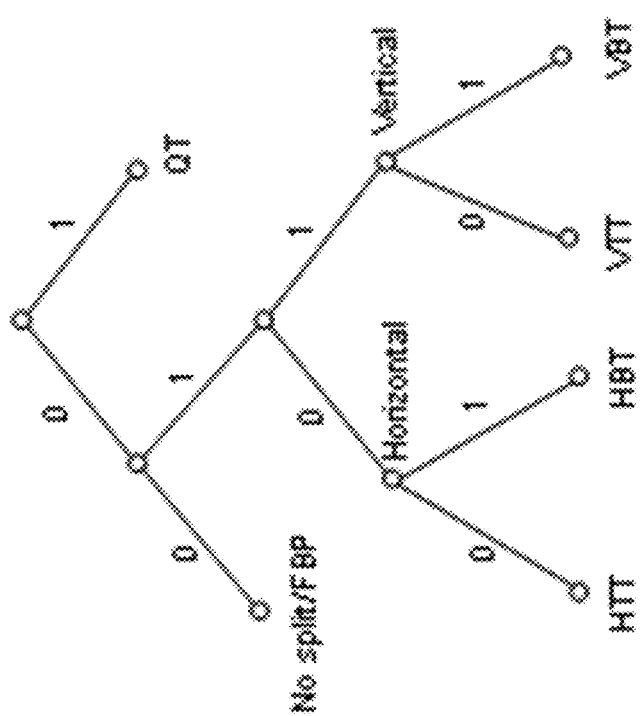
FIG. 10 shows an example of syntax and semantics for versatile boundary partitioning.

Since the forced quadtree boundary partition solution in VVC is not optimized. Some embodiments propose the boundary partition method using regular block partition syntax to keep the continuity CABAC engine as well as matching the picture boundary The versatile boundary partition obtains the following rules (both encoder and decoder):

Using exactly same partition syntax of the normal block (non-boundary) (for instance, VTM-1.0 like FIG. 10) for boundary located block, the syntax need to be unchanged.

If the no split mode is parsed for the boundary CU, used forced boundary partition (FBP) to match the picture boundary. After forced boundary partition (non-singling boundary partition), no further partition. The forced boundary partition is descripted as follow:

If the size of block is larger than the maximal allowed BT size, forced QT is used to perform the FBP in the current forced partition level;

Otherwise, if the bottom-right sample of current CU is located below the bottom picture boundary, and not extended the right boundary, forced horizontal BT is used to perform the FBP in the current forced partition level;

Otherwise, if the bottom-right sample of current CU exceeds the right side of the right picture boundary, and not below the bottom boundary, forced vertical BT is used to perform the FBP in the current forced partition level;

Otherwise, if the bottom-right sample of current CU exceeds the right side of the right picture boundary and below the bottom boundary, forced QT is used to perform the FBP in the current forced partition level.

3 Problems and Shortcomings of Present Day Implementations

1. There may be some redundancy between partitions of EQT and QT/BT/TT. For example, for a block with M×N, it may be split into vertical BT three times (firstly split to two M/2 *N partitions, then for each M/2*N partition, further apply vertical BT split) to get four M/4*N partitions. Also, to get four M/4×N partitions, the block could choose directly using EQT as FIG. 7B.

2. It is still a problem how to signal EQT efficiently.

4 Example Techniques and Embodiments

To address the problem, and others, several methods are proposed to handle the cases for EQT. Embodiments may include image or video encoder and decoders.

The techniques listed as items below should be considered as examples to explain general concepts. These embodiments should not be interpreted in a narrow way. Furthermore, these embodiments can be combined in any manner.

Figure 11B:
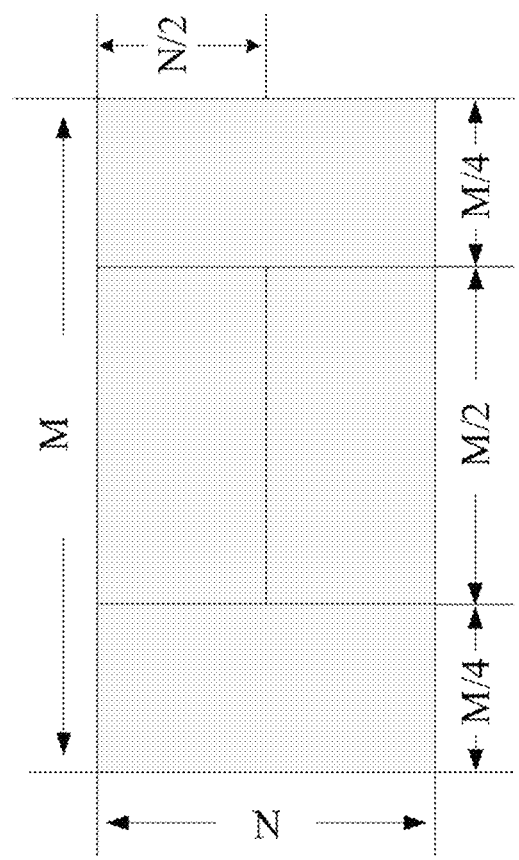
FIG. 11A-11B shows an example of allowed EQT patterns that may be further split into EQT or BT.
Figure 11A:
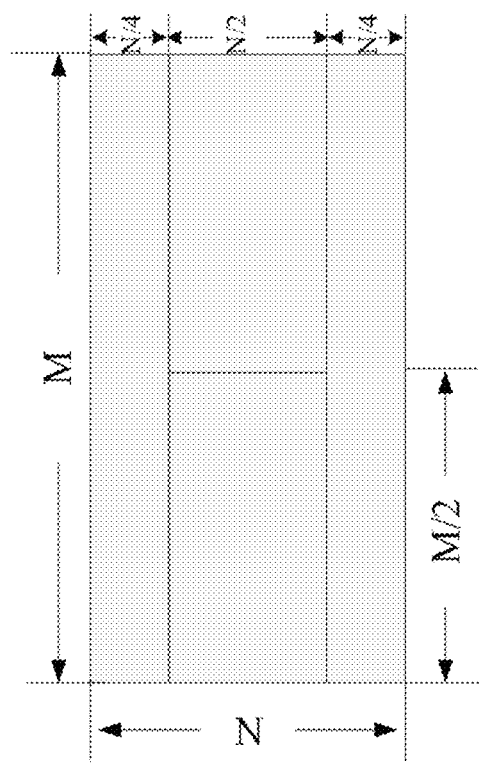
Figure 12:
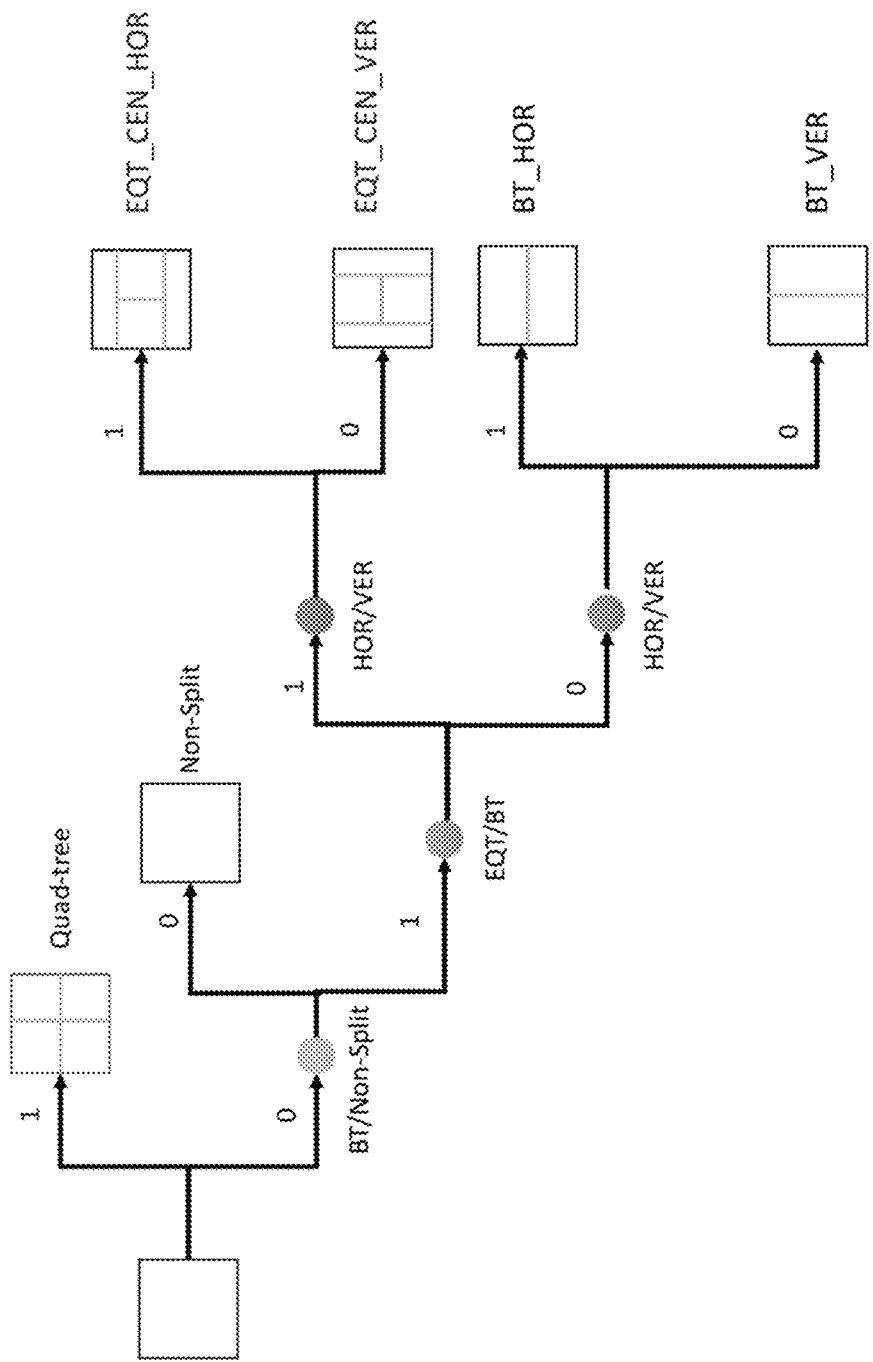
FIG. 12 shows an example of binarization of partitioning.

1. When EQT is applied to a certain block, for each of the sub-block due to EQT, it may further be split into BT and/or EQT, and BT and EQT may share the same maximum depth value denoted by $D_{BTMax}$ (e.g., MaxBTDepth in section 2.3.1)

a. In one example, only two kinds of EQT depicted in FIG. 7 may be allowed. The two allowed EQT patterns are depicted in FIGS. 11A and 11B which shows an example of allowed EQT patterns which may be further split to EQT or BT. For example, one allowed EQT pattern may include a top partition that is full width and one-fourth height, followed by two side-by-side partitions of half width and half height of the block, followed by a bottom partition of full width and one-fourth the height of the block (e.g., FIG. 11A). Another allowed partition includes a left portion of full height and one-fourth width, followed by two partitions with half width and half height vertically stacked over each other, followed by a right partition that is full height and one-fourth width (e.g., FIG. 11B). It will be appreciated that, in one aspect, each partition has equal area.
   b. Similarly, when BT is applied to a certain block, for each of the sub-blocks due to BT, it may further be split into BT and/or EQT, and BT and EQT may share the same maximum depth value.
   c. EQT and BT may use different depth increment process. For example, when each block may be assigned with a depth value denoted by $D_{BT}$ ($D_{BT}$ may start from 0). If one block (with depth value equal to $D_{BT}$) is split with EQT, each of the sub-block's depth value is set to $D_{BT}+2$.
   d. Whenever one block's associated depth is smaller than $D_{BTMax}$, it may be further split to EQT or BT.
   e. Alternatively, the maximum depth value allowed for EQT may be set to the sum of maximum depth value allowed for QT and maximum depth value allowed for BT.
2. When EQT is allowed for coding a tile/slice/picture/sequence, it may share the same maximumly allowed binary tree root node size (e.g., MaxBTSize in section 2.3.1) for coding the same video data unit.
   a. Alternatively, EQT may use different maximumly allowed root node size different from that for BT.
   b. In one example, the maximum EQT size is set to M×N, e.g., M=N=64 or 32.
   c. Alternatively, maximumly allowed root node size for EQT may be signaled from the encoder to the decoder in VPS/SPS/PPS/picture header/slice header/tile group header/tile/CTU.
3. One flag is firstly signaled to indicate whether it is BT or EQT before signaling the direction of BT or EQT (e.g., horizontal or vertical), and one more flag may be further signaled to indicate it uses horizontal or vertical splitting direction.
   a. In one example, the binarization of partitioning is shown in FIG. 12. The corresponding bin value for each bin index is listed as follows. It should be noted that it is equivalent to exchange all the "0" and "1" in Table 1. The bin string contains some '0's and one '1' which is called unary or truncated unary binarization method. That is, if the decoded bin is '1', no more bins need to be decoded.
   b. In one example, direction of BT or EQT is defined to be parallel or perpendicular to the current split direction.

TABLE 1

Example of partition splitting patterns

| Bin index | 0 | 1 | 2 | 3 | Partition types |
|---|---|---|---|---|---|
| value | 1 | — | — | | Quad-Tree |
| value | 0 | 0 | — | | Non-QT Split |
| value | 0 | 1 | 0 | 0 | Horizontal BT |
| value | 0 | 1 | 0 | 1 | Vertical BT |

TABLE 1-continued

Example of partition splitting patterns

| Bin index | 0 | 1 | 2 | 3 | Partition types |
|---|---|---|---|---|---|
| value | 0 | 1 | 1 | 0 | Horizontal EQT (marked as EQT_CEN_HOR) |
| value | 0 | 1 | 1 | 1 | Vertical EQT (marked as EQT_CEN_VER) |
| meaning | QT or not? | Further split with other partition trees? | BT or EQT? | Horizontal or vertical? | | c. Alternatively, one flag may be firstly signaled to indicate whether QT or EQT or non-(EQT and QT) is used. If non-(EQT and QT) is selected, BT splitting information may be further signaled.
4. The flag to indicate whether EQT or BT is used may be context coded, and the context is dependent on the depth information of both current block's and its neighboring blocks
   a. In one example, the neighboring blocks may be defined as the above and left blocks relative to the current block.
   b. In one example, both the quad-tree depth and BT/EQT depth may be utilized in the coding of the flag.
   c. One variable $D_{ctx}$ is derived for each block based on its depth information, e.g., it is set to (2*QT depth+BT/EQT depth). Alternatively, (2*QT depth+BT/EQT depth) may be further quantized before being used for context selection.
   d. Three contexts may be utilized for coding this flag.
      (a) In on example, the context index is defined as $(( D_{ctx}$ of above block$> D_{ctx}$ of current block)?1:0)+
   $(( D_{ctx}$ of left block$> D_{ctx}$ of current block)?1:0)

(b) When a neighboring block, its associated $D_{ctx}$ is set to 0
5. It is proposed whether to and how to apply EQT split may depend on the width and height (denoted as W and H) of the block to be split.
   a. In one example, all kinds of EQT splits are not allowed when W>=T1 and H>=T2, where T1 and T2 are predefined integers e.g. T1=T2=128 or T1=T2=64. Alternatively, T1/T2 can be signaled from the encoder to the decoder in VPS/SPS/PPS/picture header/slice header/tile group header/tile/CTU.
   b. In one example, all kinds of EQT splits are not allowed when W>=T1 or H>=T2, where T1 and T2 are predefined integers e.g. T1=T2=128 or T1=T2=64. Alternatively, T1/T2 can be signaled from the encoder to the decoder in VPS/SPS/PPS/picture header/slice header/tile group header/tile/CTU.
   c. In one example, all kinds of EQT splits are not allowed when W<=T1 and H<=T2, where T1 and T2 are predefined integers e.g. T1=T2=8 or T1=T2=16. Alternatively, T1/T2 can be signaled from the encoder to the decoder in VPS/SPS/PPS/picture header/slice header/tile group header/tile/CTU.
   d. In one example, all kinds of EQT splits are not allowed when W<=T1 or H<=T2, where T1 and T2 are predefined integers e.g. T1=T2=8 or T1=T2=16.

Alternatively, T1/T2 can be signaled from the encoder to the decoder in VPS/SPS/PPS/picture header/slice header/tile group header/tile/CTU.

e. In one example, horizontal EQT as shown in FIG. 11A is not allowed when W>=T, where T is a predefined integer e.g. T=128 or T=64. Alternatively, T can be signaled from the encoder to the decoder in VPS/SPS/PPS/picture header/slice header/tile group header/tile/CTU.
   f. In one example, horizontal EQT as shown in FIG. 11A is not allowed when H>=T, where T is a predefined integer e.g. T=128 or T=64. Alternatively, T can be signaled from the encoder to the decoder in VPS/SPS/PPS/picture header/slice header/tile group header/tile/CTU.
   g. In one example, horizontal EQT as shown in FIG. 11A is not allowed when W<=T, where T is a predefined integer e.g. T=8 or T=16. Alternatively, T can be signaled from the encoder to the decoder in VPS/SPS/PPS/picture header/slice header/tile group header/tile/CTU.
   h. In one example, horizontal EQT as shown in FIG. 11A is not allowed when H<=T, where T is a predefined integer e.g. T=8 or T=16. Alternatively, T can be signaled from the encoder to the decoder in VPS/SPS/PPS/picture header/slice header/tile group header/tile/CTU.
   i. In one example, vertical EQT as shown in FIG. 11B is not allowed when W>=T, where T is a predefined integer e.g. T=128 or T=64. Alternatively, T can be signaled from the encoder to the decoder in VPS/SPS/PPS/picture header/slice header/tile group header/tile/CTU.
   j. In one example, vertical EQT as shown in FIG. 11B is not allowed when H>=T, where T is a predefined integer e.g. T=128 or T=64. Alternatively, T can be signaled from the encoder to the decoder in VPS/SPS/PPS/picture header/slice header/tile group header/tile/CTU.
   k. In one example, vertical EQT as shown in FIG. 11B is not allowed when W<=T, where T is a predefined integer e.g. T=8 or T=16. Alternatively, T can be signaled from the encoder to the decoder in VPS/SPS/PPS/picture header/slice header/tile group header/tile/CTU.
   l. In one example, vertical EQT as shown in FIG. 11B is not allowed when H<=T, where T is a predefined integer e.g. T=8 or T=16. Alternatively, T can be signaled from the encoder to the decoder in VPS/SPS/PPS/picture header/slice header/tile group header/tile/CTU.
   m. In one example, when any one of the four sub-block due to EQT split has a width or height equal to K and K×K transform is not supported/defined in the codec, EQT splitting is not allowed.
   n. Alternatively, whether to and how to apply EQT split may depend on the width and/or height (denoted as W and H) of the sub-block due to EQT splitting of one block.

6. It is proposed whether to and how to apply EQT split may depend on the position of the block to be split.
   a. In one example, whether to and how to apply EQT split may depend on whether the current block to be split is at the border of the picture or not. In one example, suppose (x, y) is the coordinate of the top-left position of the current block, (PW, PH) are the width and height of the picture, (W, H) are the width and height of a block with the current QT depth and BT/EQT depth. Then the current block is at the bottom border when y+H>PH; the current block is at the right border when x+W>PW; the current block is at the bottom-right corner border when y+H>PH and x+W>PW.
      (a) In one example, all kinds of EQT splits are not allowed when the current block is at the bottom border;
      (b) In one example, all kinds of EQT splits are not allowed when the current block is at the right border;
      (c) In one example, all kinds of EQT splits are not allowed when the current block is at the bottom-right corner border;
      (d) In one example, horizontal EQT as shown in FIG. 11A not allowed when the current block is at the bottom border;
      (e) In one example, horizontal EQT as shown in FIG. 11A is not allowed when the current block is at the right border;
      (f) In one example, horizontal EQT as shown in FIG. 11A is not allowed when the current block is at the bottom-right corner border;
      (g) In one example, vertical EQT as shown in FIG. 11B is not allowed when the current block is at the bottom border;
      (h) In one example, vertical EQT as shown in FIG. 11B is not allowed when the current block is at the right border;
      (i) In one example, vertical EQT as shown in FIG. 11B is not allowed when the current block is at the bottom-right corner border;
      (j) In one example, horizontal EQT and horizontal BT may be allowed when the current block is at the bottom border.
      (k) In one example, vertical EQT and vertical BT may be allowed when the current block is at the right border.

7. When one or some kinds of EQT is not allowed, the followings may apply.
   a. In one example, the parsing procedure depends on whether one or some kinds of EQT is not allowed. The corresponding syntax elements related to EQT are not signaled if one or some kinds of EQT is not allowed.
   b. In an alternative example, the parsing procedure does not depend on one or some kinds of EQT is not allowed. The corresponding syntax elements related to EQT are signaled no matter one or some kinds of EQT is allowed or not.
      (a) In one example, a conformance encoder must not signal one or some kinds of EQT if they are not allowed.
      (b) In one example, a conformance decoder can interpret EQT as some other kinds of split such as QT, BT or not split when it parses out an EQT split but that kind of EQT is not allowed.

8. At the encoder side, the maximumly allowed EQT depth may depend on the distance between current picture and the reference picture distance, e.g., POC difference.
   a. In one example, the maximumly allowed EQT depth may depend on the temporal layer id of the current picture.

b. In one example, the maximumly allowed EQT depth may depend on whether the current picture will be referenced by other pictures or not.

c. In one example, the maximumly allowed EQT depth may depend on the quantization parameter.

9. At the encoder side, at the certain BT/EQT depth, when the best mode of current block and its neighbouring blocks are both skip mode, there is no need to further check the rate-distortion cost calculation for further splitting.

a. In one example, when the best mode of current block and its neighbouring blocks are skip mode or merge mode, there is no need to further check the rate-distortion cost calculation for further splitting.

b. In one example, if the best mode of the parent block is skip mode, there is no need to further check the rate-distortion cost calculation for further splitting.

10. At the encoder side, the average EQT depth for EQT-split blocks of previously coded pictures/slices/tiles is recorded. when coding the current video unit, there is no need to further check the rate-distortion cost calculation for larger EQT depth compared to the recorded average depth.

a. In one example, the average EQT value may be recorded for each temporal layer. In this case, for each video data to be coded, it only utilizes the recorded average value for the same temporal layer.

b. In one example, only the average EQT value for the first temporal layer is recorded. In this case, for each video data to be coded, it always utilizes the recorded average value for the first temporal layer.

11. At the encoder side, the average size for EQT-split blocks of previously coded pictures/slices/tiles is recorded. when coding the current video unit, there is no need to further check the rate-distortion cost calculation for smaller block sizes compared to the recorded block size.

a. In one example, the average EQT block size may be recorded for each temporal layer. In this case, for each video data to be coded, it only utilizes the recorded average value for the same temporal layer.

b. In one example, only the average EQT block size for the first temporal layer is recorded. In this case, for each video data to be coded, it always utilizes the recorded average value for the first temporal layer.

5 Embodiment Examples

Syntax changes on top of existing design are highlighted in large font text.

```
coding_quadtree (x0, y0, uiAbsPartIdx, uiDepth, uiWidth,
uiHeight) {
  CUPelX = x0
  CUPelY = y0
  uiLPelX    =    CUPelX    +
g_auiRasterToPelX[g_auiZscanToRaster[uiAbsPartIdx]]
  uiRPelX = uiLPelX + uiWidth − 1
  uiTPelY    =    CUPelY    +
g_auiRasterToPelY[g_auiZscanToRaster[uiAbsPartIdx] ]
  uiBPelY = uiTPelY + uiHeight − 1
  uiQTWidth = uiCTUSize >> uiDepth
  uiQTHeight = uiCTUSize >> uiDepth
  uiBTDepth=g_aucConvertToBit[uiQTWidth]−
g_aucConvertToBit[uiWidth]+g_aucConvertToBit[uiQTHeight] −
g_aucConvertToBit[uiHeight]
```

-continued

```
  if (uiCTUSize >> uiDepth == uiWidth && uiWidth ==
uiHeight) {
    if ( (uiRPelX < PicWidth) && (uiBPelY < PicHeight) ) {
      split_flag                                          ae(v)
    }
    else if ( uiWidth == MinQTSize ) {
      SplitFlag = 0
    }
    else{
      SplitFlag = 1
    }
  }
  if (SplitFlag == 0 && uiHeight > uiMinBTSize || uiWidth>
uiMinBTSize) && uiWidth <= uiMaxBTSize && uiHeight <=
uiMaxBTSize && uiBTDepth < uiMaxBTD ){
    bt_split_flag                                         ae(v)
    if (BtSplitFlag) {
      eqt_split_flag                                      ae(v)
      if (EqtSplitFlag) {
        eqt_split_dir                                     ae(v)
        BTSplitMode = (EqtSplitDir == 0) ? 3: 4
      }
      else {
        bt_split_dir                                      ae(v)
        BTSplitMode = (BtSplitDir == 0) ? 1:2;
      }
    else {
      BtSplitFlag = 0;
      BTSplitMode = 0;
    }
  }
  if ( SplitFlag ) {
    uiQNumParts = (NumPartInCU >> (uiDepth << 1)) >> 2
    for (UInt uiPartUnitIdx = 0; uiPartUnitIdx < 4;
uiPartUnitIdx++, uiAbsPartIdx += uiQNumParts) {
      uiLPelX      =      CUPelX      +
g_auiRasterToPelX[g_auiZscanToRaster[uiAbsPartIdx]]
      uiTPelY      =      CUPelY      +
g_auiRasterToPelY[g_auiZscanToRaster[uiAbsPartIdx]]
      if ( (uiLPelX < PicWidth) && (uiTPelY < PicHeight) ) {
        coding_quadtree(x0, y0, uiAbsPartIdx, uiDepth +
1, uiWidth >> 1, uiHeight >>1)
      }
    }
  }
  else if ( BTSplitMode == 1 ) {
    for ( UInt uiPartUnitIdx = 0; uiPartUnitIdx < 2;
uiPartUnitIdx++ ) {
      if ( uiPartUnitIdx == 1) {
        uiAbsPartIdx                                      =
g_auiRasterToZscan[g_auiZscanToRaster[uiAbsPartIdx] +
(uiHeight>>1) / MinCUHeight * NumPartInCtuWidth]
      }
      coding_quadtree(x0, y0, uiAbsPartIdx,uiDepth,
uiWidth, uiHeight >> 1)
    }
  }
  else if ( BTSplitMode == 2 ) {
    for ( UInt uiPartUnitIdx = 0; uiPartUnitIdx < 2;
uiPartUnitIdx++ ) {
      if ( uiPartUnitIdx == 1) {
        uiAbsPartIdx                                      =
g_auiRasterToZscan[g_auiZscanToRaster[uiAbsPartIdx] +
(uiWidth >> 1) / MinCUWidth]
      }
      coding_quadtree(x0, y0, uiAbsPartIdx, uiDepth,
uiWidth >> 1, uiHeight)
    }
  }
  else if (BTSplitMode == 3) { /*notes: related to EQT
horizontal split*/
    UInt orgAbsPartIdx = uiAbsPartIdx
    UInt uiSubWidth = 0
    UInt uiSubHeight = 0
    for (UInt uiPartUnitIdx = 0; uiPartUnitIdx < 4;
uiPartUnitIdx++) {
      if (uiPartUnitIdx == 0 || uiPartUnitIdx == 3) {
        uiSubWidth = uiWidth
        uiSubHeight = uiHeight >> 2
```

-continued

```
            uiAbsPartIdx = orgAbsPartIdx
            uiAbsPartIdx       =       g_auiRasterToZscan[g_
auiZscanToRaster[uiAbsPartIdx] + ((uiHeight >> 2) *
uiPartUnitIdx) / MinCUHeight * NumPartInCtuWidth]
            }
        else if (uiPartUnitIdx == 1) {
            uiSubWidth = uiWidth >> 1
            uiSubHeight = uiHeight >> 1
            uiAbsPartIdx = orgAbsPartIdx
            uiAbsPartIdx       =       g_auiRasterToZscan[g_
auiZscanToRaster[uiAbsPartIdx] + (uiHeight >> 2) /
MinCUHeight * NumPartInCtuWidth]
            }
        else if (uiPartUnitIdx == 2) {
            uiSubWidth = uiWidth >> 1
            uiSubHeight = uiHeight >> 1
            uiAbsPartIdx       =       g_auiRasterToZscan[g_
auiZscanToRaster[uiAbsPartIdx] + (uiWidth >> 1) /
MinCUWidth]
            }
        coding_quadtree(x0, y0, uiAbsPartIdx, uiDepth,
uiSubWidth, uiSubHeight)
        }
    }
    else if (BTSplitMode == 4) { /*notes: related to EQT
    Vertical split*/
        UInt orgAbsPartIdx = uiAbsPartIdx
        UInt uiSubWidth = 0
        UInt uiSubHeight = 0
        for (UInt uiPartUnitIdx = 0; uiPartUnitIdx < 4;
        uiPartUnitIdx++) {
            if (uiPartUnitIdx == 0 || uiPartUnitIdx == 3) {
                uiSubWidth = uiWidth >> 2
                uiSubHeight = uiHeight
                uiAbsPartIdx = orgAbsPartIdx
                uiAbsPartIdx                     =
g_auiRasterToZscan[g_auiZscanToRaster[uiAbsPartIdx] +
((uiWidth >> 2) * uiPartUnitIdx) / MinCUWidth]
                }
            else if (uiPartUnitIdx == 1) {
                uiSubWidth = uiWidth >> 1
                uiSubHeight = uiHeight >> 1
                uiAbsPartIdx = orgAbsPartIdx
                uiAbsPartIdx                     =
g_auiRasterToZscan[g_auiZscanToRaster[uiAbsPartIdx] +
(uiWidth >> 2) / MinCUWidth]
                }
            else if (uiPartUnitIdx == 2) {
                uiSubWidth = uiWidth >> 1
                uiSubHeight = uiHeight >> 1
                uiAbsPartIdx                     =
g_auiRasterToZscan[g_auiZscanToRaster[uiAbsPartIdx] +
(uiHeight >> 1) / MinCUHeight * NumPartInCtuWidth]
                }
            coding_quadtree(x0, y0, uiAbsPartIdx, uiDepth,
uiSubWidth, uiSubHeight)
            }
        }
    else {
        coding_quadtree (x0, y0, uiAbsPartIdx, uiDepth,
        uiWidth, uiHeight )
        }
    }
}
```

Figure 13A:
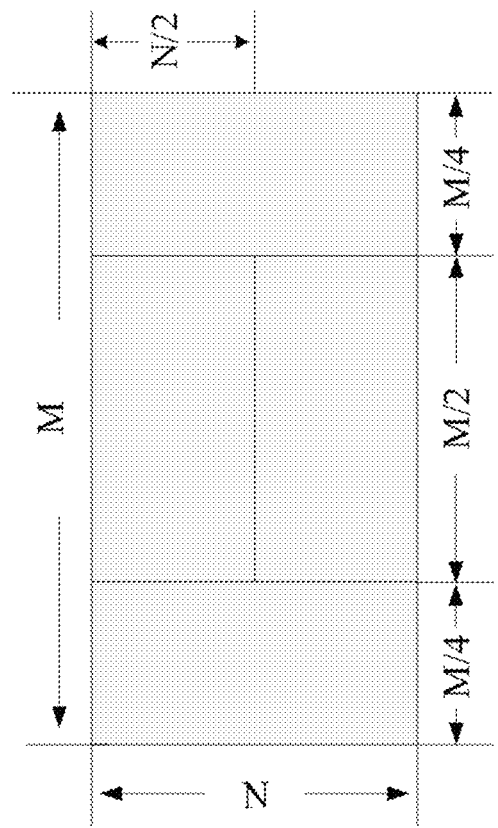
FIGS. 13A and 13B show examples of horizontal and vertical EQTs.
Figure 13B:
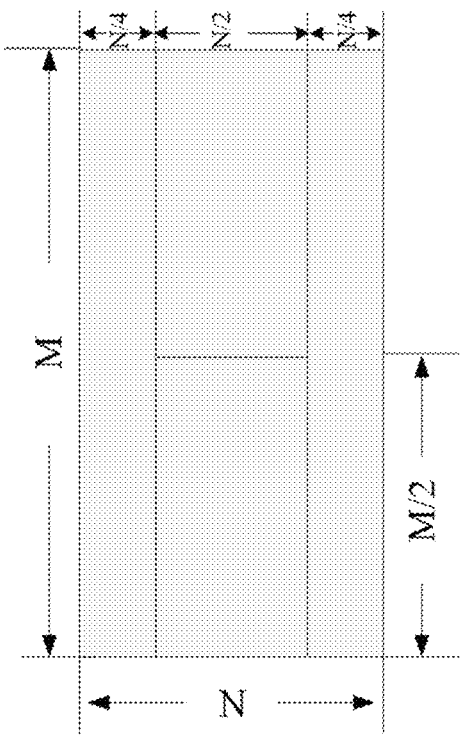

Example of Semantics eqt_split_flag: a flag to indicate whether EQT is enabled or disabled for one block eqt_split_dir: a flag to indicate whether horizontal EQT is used or vertical EQT is used. FIGS. 13A and 13B show example of quadtree partitioning for horizontal EQT partitions and vertical EQT partitions.

Figure 14:
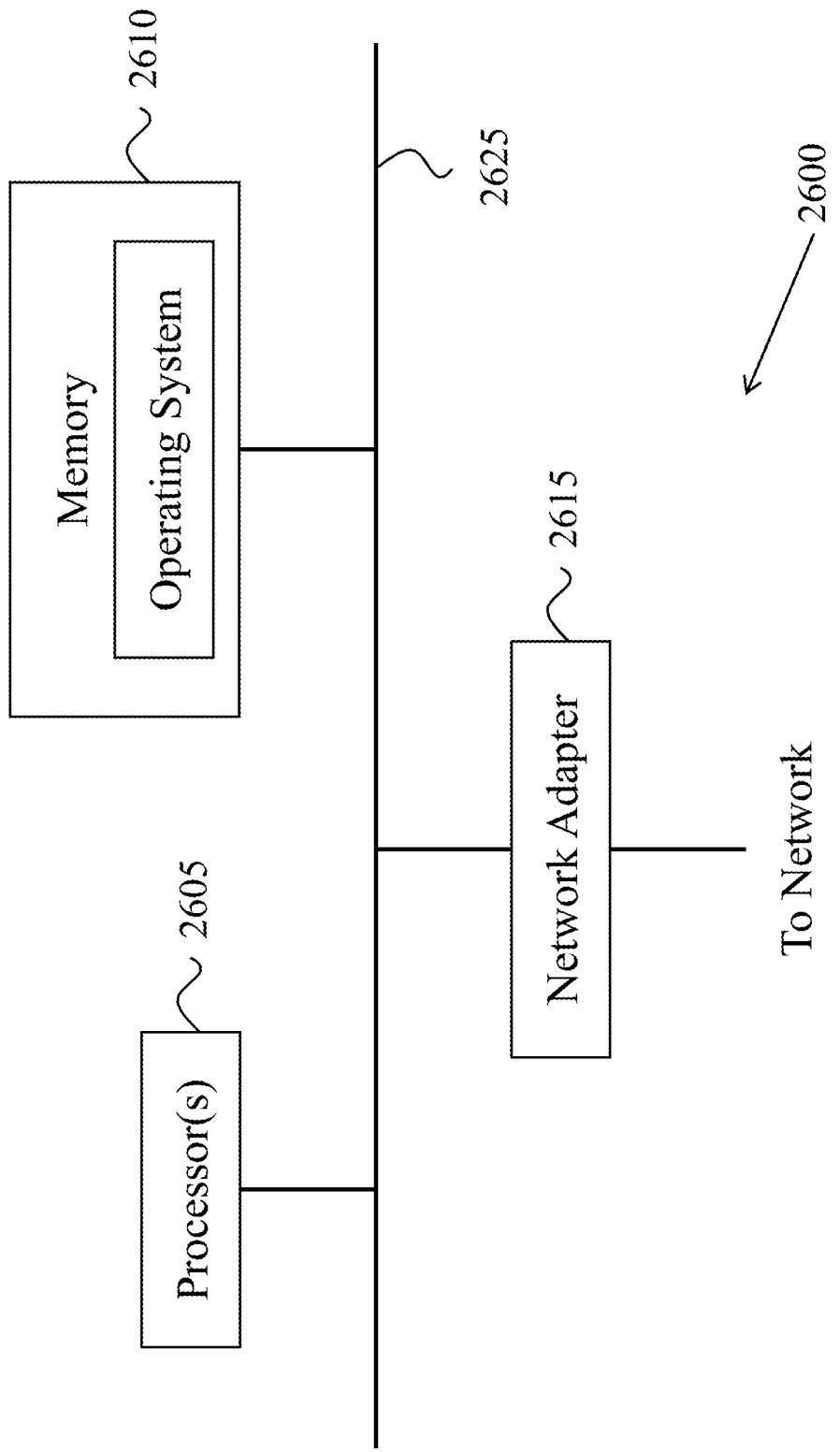
FIG. 14 shows an example hardware platform for implementing some disclosed methods.

FIG. 14 is a block diagram illustrating an example of the architecture for a computer system or other control device 2600 that can be utilized to implement various portions of the presently disclosed technology. In FIG. 14, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 15:
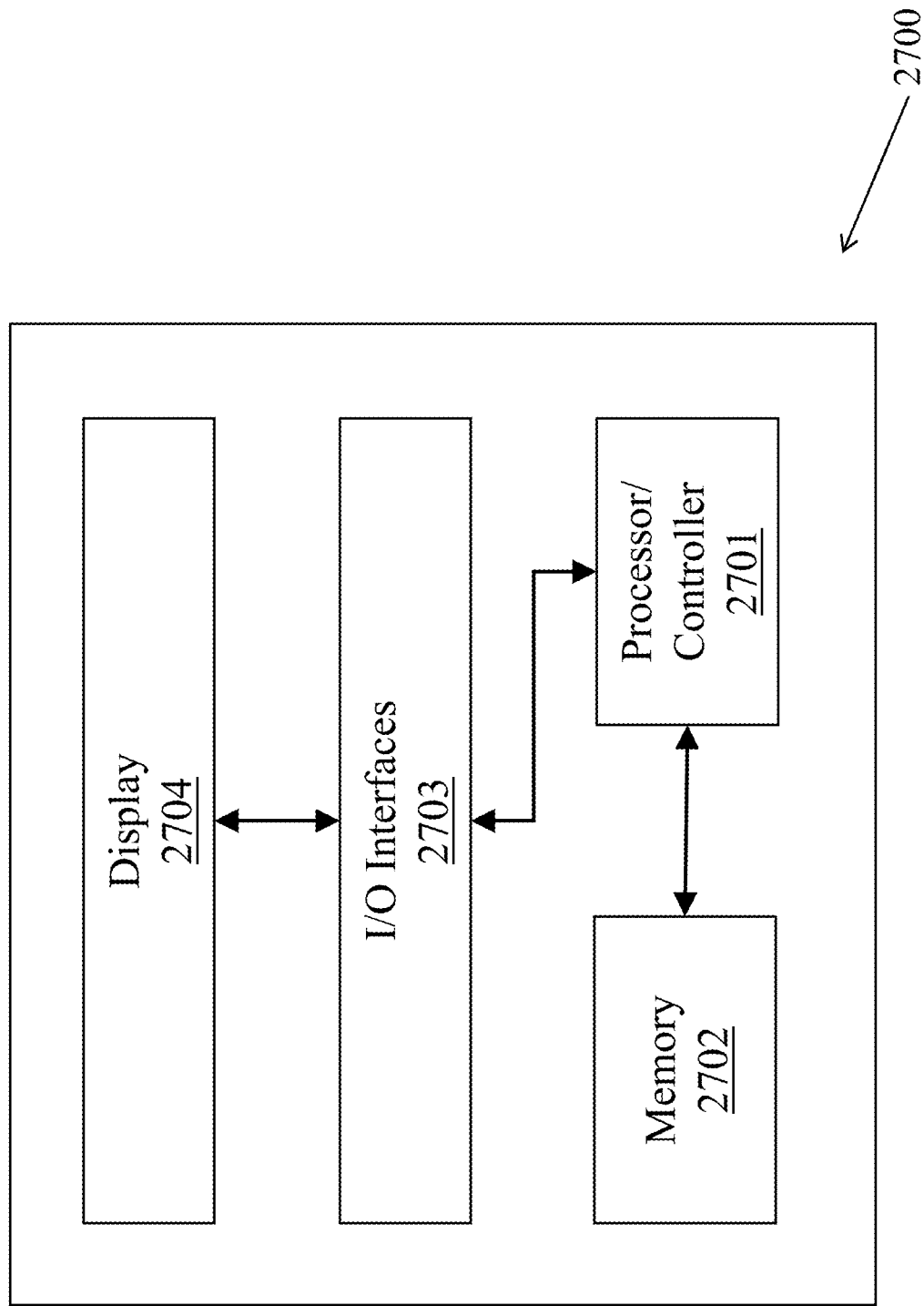
FIG. 15 shows another example hardware platform for implementing some disclosed methods.

FIG. 15 shows a block diagram of an example embodiment of a device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

Figure 16:
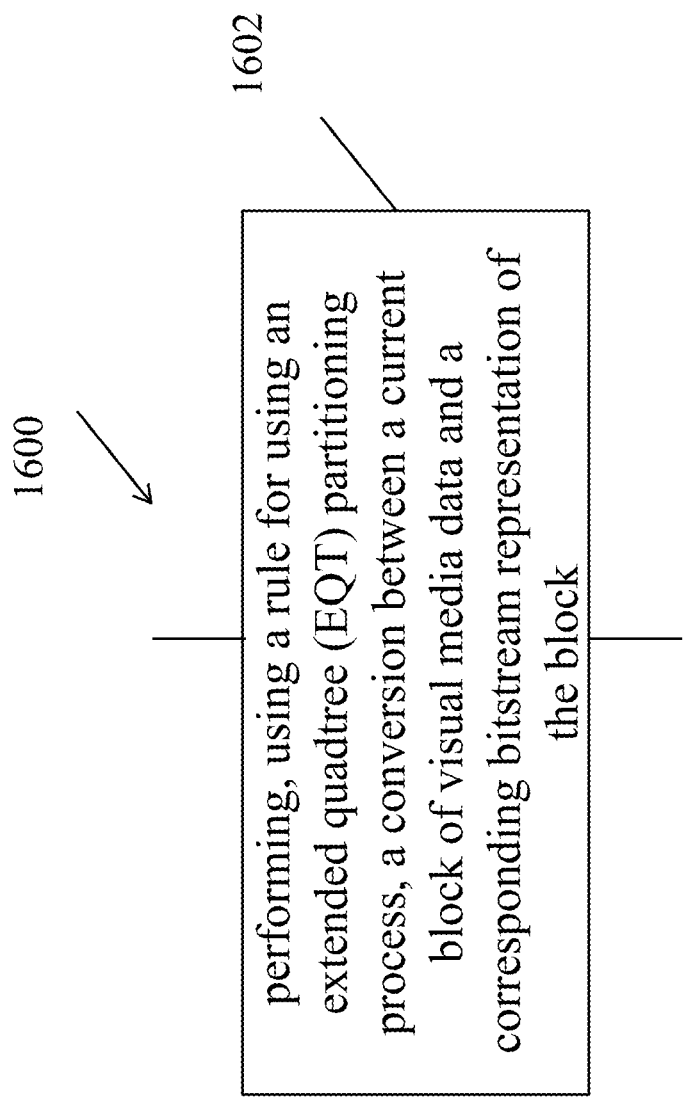
FIG. 16 is a flowchart of an example method of visual media processing.

FIG. 16 is a flowchart of a method 1600 of visual media processing. The method 1600 includes performing (1602), using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block, and wherein the rule specifies that in case that the rule is used for partitioning the current block, then each subblock is further split into a binary tree (BT) partitioning or another EQT partitioning, and both BT and the another EQT partitioning have depths that meet a pre-defined relationship.

Another method of visual media processing includes performing, using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block, and wherein the rule allows the EQT partitioning process for the current block based on a width or a height of the current block.

Another method of visual media processing includes performing, using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block, and wherein the rule allows the EQT partitioning process for the current block based on a position of the current block.

Another method of visual media processing includes performing, using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block, and wherein the rule allows a maximum depth of the EQT partitioning process to depend on a distance between a current picture of the current block and a reference picture for the current block or a quantization parameter of the current block or a temporal layer id of the current picture.

In the disclosed embodiments, the bitstream representation of a current block of video may include bits of a bitstream (compressed representation of a video) that may be non-contiguous and may depend on header information, as is known in the art of video compression. Furthermore, a current block may include samples representative of one or more of luma and chroma components, or rotational variations thereof (e.g, YCrCb or YUV, and so on).

The listing of clauses below describes some embodiments and techniques as follows.

1. A method of visual media processing, comprising: performing, using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block; and wherein the rule specifies that in case that the rule is used for partitioning the current block, then each subblock is further split into a binary tree (BT) partitioning or another EQT partitioning, and both BT and the another EQT partitioning have depths that meet a pre-defined relationship.

2. The method of clause 1, wherein the conversion includes generating the current block from the bitstream representation.

3. The method of clause 1, wherein the conversion includes generating the bitstream representation from the current block.

4. The method of any of clauses 1 to 3, wherein the EQT partitioning process partitions the current block into one of only two possible partitionings.

5. The method of clause 4, wherein the current block comprises M×N pixels, where M and N are integers and wherein the two possible partitions include a first partitioning comprising an M×N/4 top portion, followed by two side-by-side M/2×N/2 middle portions, followed by an M×N/4 bottom portions, or a second partitioning comprising an M/4×N left portion, two M/2×N/2 middle portions and one M/4×N right portion.

6. The method of clause 1, wherein the pre-defined relationship specifies that a BT and EQT partitions have different values or the pre-defined relationship specifies that the depth of EQT partitions is equal to a sum of the depth of the BT partitions and quadtree (QT) partitions.

5. The method of clause 1, wherein the pre-defined relationship specifies that a BT and EQT partitions have a same value.

6. The method of clause 1, wherein the rule specifies that in case that the current block is partitioned using BT, each partition is partitioned using one of BT or EQT partitioning.

7. The method of clause 1, wherein the rule specifies that, in case that the current block is partitioned using EQT, each resulting sub-block has a depth value two more than that of the current block.

8. The method of any of clauses 1 to 7, wherein the rule further specifies to use a same allowed root node size for all blocks in a picture tile or a slice or a picture or a sequence of pictures as that used for binary tree partitioning.

9. The method of any of clauses 1 to 7, wherein the rule further specifies to use a different allowed root node size for all blocks in a picture tile or a slice or a picture or a sequence of pictures as that used for binary tree partitioning.

10. The method of any of clauses 1 to 7, wherein the bitstream representation is configured to indicate a maximum allowed root node size for the EQT partitioning process at a video level, or sequence level or picture level or picture header level or slice header level or tile group header level or tile level or coding tree unit level.

11. The method of any of clauses 1 to 9, wherein the bitstream representation is configured to include a first field indicative of partitioning of the current block between EQT partitioning or BT partitioning and a second field indicative of a splitting direction for the current block between horizontal and vertical directions.

12. The method of clause 9 to 11, wherein the splitting direction is relative to a split direction of a previous block.

13. The method of any of clauses 9 to 12, wherein the first field or the second field are context coded depending on a depth information of one or more neighboring blocks or a depth information of a current block.

14. The method of clause 13, wherein the neighboring block is an above block or a left block relative to the current block.

15. The method of any of clauses 13 and 14, wherein a quantized value of the depth information of the one or more neighboring blocks or the depth information of the current block is used for the context coding.

16. A method of visual media processing, comprising: performing, using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block; and wherein the rule allows the EQT partitioning process for the current block based on a width or a height of the current block.

17. The method of clause 16, wherein the conversion includes generating the current block from the bitstream representation.

18. The method of clause 16, wherein the conversion includes generating the bitstream representation from the current block.

19. The method of any of clauses 16 to 18, wherein the rule disallows the EQT partitioning when the width is greater than or equal to T1 or the height is greater than or equal to T2, wherein T1 and T2 are integers.

20. The method of clause 19, wherein T1 and T2 are pre-defined.

21. The method of clause 19, wherein the bitstream representation is configured to carry an indication of T1 and T2.

22. The method of clause 21, wherein the indication of T1 and T2 is indicated at a video level or a sequence level or a picture level or a slice header level or a tile group header level or a tile level or a coding tree unit level.

23. The method of any of clauses 16 to 18, wherein the rule disallows the EQT partitioning when the width is less than or equal to T1 or the height is less than or equal to T2, wherein T1 and T2 are integers.

24. The method of any of clauses 16 to 18, wherein the rule disallows the EQT partitioning when the width is greater than or equal to the height.

25. The method of any of clauses 16 to 18, wherein the rule disallows the EQT partitioning when the width is less than the height.

26. A method of visual media processing, comprising: performing, using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block; and wherein the rule allows the EQT partitioning process for the current block based on a position of the current block.

27. The method of clause 26, wherein the conversion includes generating the current block from the bitstream representation.

28. The method of clause 26, wherein the conversion includes generating the bitstream representation from the current block.

29. The method of any of clauses 26 to 28, wherein the rule disallows the EQT partitioning process for the current block that is at a bottom border of a video region.

30. The method of any of clauses 26 to 28, wherein the rule disallows the EQT partitioning process for the current block that is at a right border of a video region.

31. The method of any of clauses 26 to 28, wherein the rule disallows the EQT partitioning process for the current block that is a corner block of a video region.

32. The method of clause 31, wherein the corner corresponds to a bottom right corner of the video region.

33. The method of clause 26, wherein the rule allows use of a horizontal EQT partitioning or a horizontal binary tree partitioning the current block that is at a bottom border of a video region.

34. The method of clause 26, wherein the rule allows use of a horizontal EQT partitioning or a horizontal binary tree partitioning the current block that is at a right border of the a video region.

35. The method of any of clauses 1 to 32, wherein in case that the rule disallows the EQT partitioning process for the current block, then corresponding syntax elements are omitted from the bitstream representation.

36. The method of any of clauses 1 to 31, wherein in case that the rule disallows the EQT partitioning process for the current block, then corresponding syntax elements are included with a default value in the bitstream representation 37. A method of visual media processing, comprising: performing, using a rule for using an extended quadtree (EQT) partitioning process, a conversion between a current block of visual media data and a corresponding bitstream representation of the block, wherein the EQT partitioning process includes partitioning a given block into exactly four sub-blocks, at least one of which has a size different from half of width of the given block times half of a height of the given block; and wherein the rule allows a maximum depth of the EQT partitioning process to depend on a distance between a current picture of the current block and a reference picture for the current block or a quantization parameter of the current block or a temporal layer id of the current picture.

38. The method of clause 37, wherein the conversion includes generating the current block from the bitstream representation.

39. The method of clause 37, wherein the conversion includes generating the bitstream representation from the current block.

40. The method of any of clauses 1 to 38, wherein the rule specifies to disable the EQT partitioning process in case that the current block and neighboring blocks are to be encoded using skip mode or in case that a coding depth of the current block is above an average coding depth of previously coded blocks.

41. The method of clause 40, wherein the average coding depth is calculated over previously encoded picture or a slice or a tile in which the current block is positioned.

42. The method of clause 40, wherein the average coding depth is calculated for a temporal layer in which the current block is positioned.

43. A video processing apparatus comprising a processor configured to implement a method recited in any one or more of clauses 1 to 42.

44. The apparatus of clause 43, wherein the apparatus is a video encoder.

45. The apparatus of clause 43, wherein the apparatus is a video decoder.

46. A computer readable media, a program comprising code for a processor to carry out a method recited in any one or more of clauses 1 to 42.

With respect to the above listed clauses and the list of techniques in section 4, the partitioning techniques may be specified using parameter sets (picture or video parameter sets) or pre-specified based on a rule. Accordingly, the number of bits needed to signal partitioning of blocks may be reduced. Similarly, the partitioning decision may also be simplified due to the various rules specified in this document, thereby allowing for lower complexity implementations of encoders or decoders.

Furthermore, the position dependency of the partitioning rule may be based on a video region in which the current block is present (e.g., clause 26). The video region may include the current block or a larger portion such as a tile, or a slice or a picture in which the current block is present.

Figure 17:
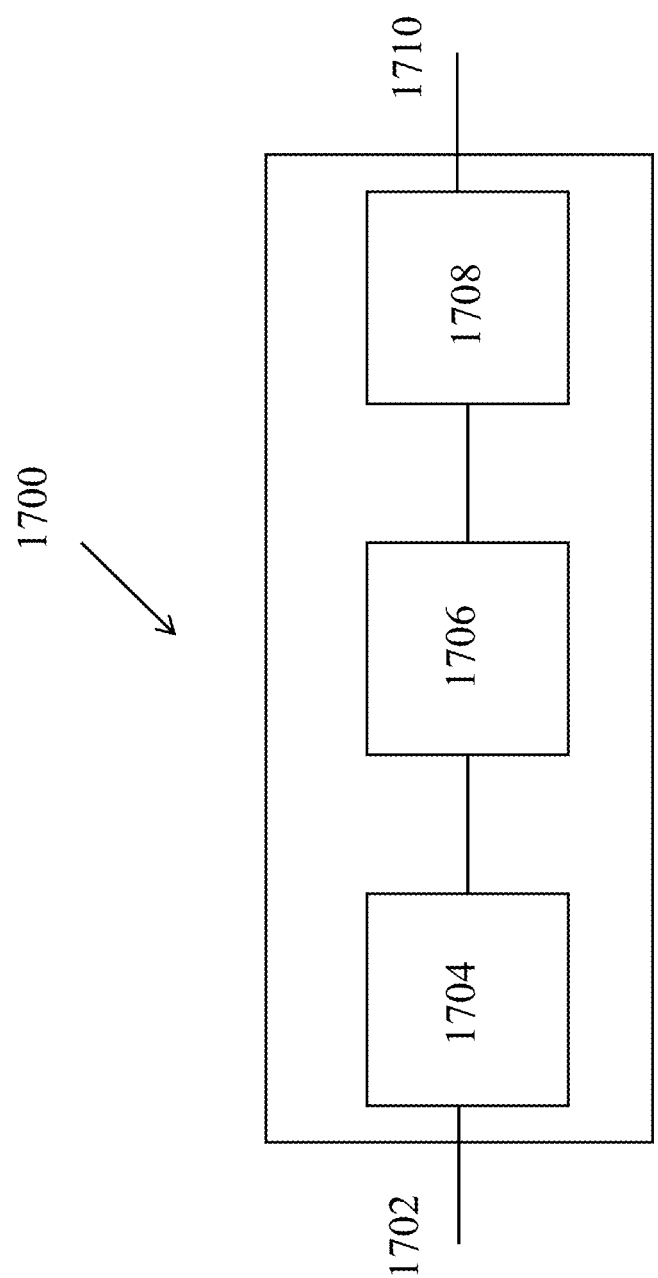
FIG. 17 is a block diagram of an example video processing system in which disclosed techniques may be implemented.

FIG. 17 is a block diagram showing an example video processing system 1700 in which various techniques disclosed herein may be implemented. Various implementations may include some or all of the components of the system 1700. The system 1700 may include input 1702 for receiving video content. The video content may be received in a raw or uncompressed format, e.g., 8 or 10 bit multi-component pixel values, or may be in a compressed or encoded format. The input 1702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1700 may include a coding component 1704 that may implement the various coding or encoding methods described in the present document. The coding component 1704 may reduce the average bitrate of video from the input 1702 to the output of the coding component 1704 to produce a coded representation of the video. The coding techniques are therefore sometimes called video compression or video transcoding techniques. The output of the coding component 1704 may be either stored, or transmitted via a communication connected, as represented by the component 1706. The stored or communicated bitstream (or coded) representation of the video received at the input 1702 may be used by the component 1708 for generating pixel values or displayable video that is sent to a display interface 1710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 18:
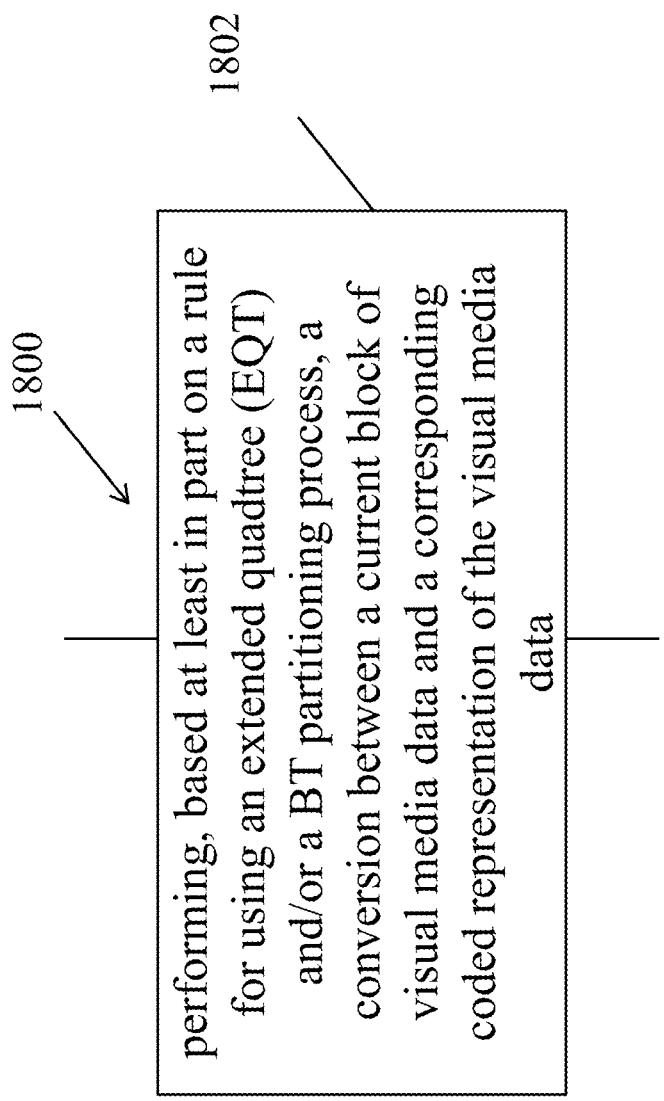
FIG. 18 is a flowchart for an example method of video processing.

FIG. 18 is a flowchart for an example method of video processing. The method 1800 includes performing (at step 1802), based at least in part on a rule for using an extended quadtree (EQT) and/or a BT partitioning process, a conversion between a current block of visual media data and a corresponding coded representation of the visual media data.

In some implementations (e.g., embodiments 1, 1(b), and 2), additional modifications can be performed to method 1800. For example, the EQT partitioning process includes partitioning a given block into exactly four sub-blocks, at least one of which has a size different from half of a width of the given block times half of a height of the given block; and wherein the rule specifies that if the rule is used for partitioning the current block, then each subblock is further split in accordance with a binary tree (BT) partitioning process or a second EQT partitioning process, and further wherein, both the BT process and the second EQT partitioning process have tree depths that meet a pre-defined relationship. Alternatively, the BT partitioning process includes partitioning a given block into exactly two sub-blocks; and wherein the rule specifies that if the rule is used for partitioning the current block, then each subblock is further split in accordance with another binary tree (BT) partitioning process and/or an EQT partitioning process, wherein the EQT partitioning process includes partitioning a given block into exactly four sub-blocks, at least one of which has a size different from half of a width of the given block times half of a height of the given block, and further wherein, both the BT process and the EQT partitioning process have depths that meet a pre-defined relationship. Alternatively, wherein the EQT partitioning process includes partitioning a given block into exactly four sub-blocks, at least one of which has a size different from half of a width of the given block times half of a height of the given block; and wherein the rule specifies that if the rule is used for partitioning the current block, then a same allowed root node size is used for all blocks in a tile or a slice or a picture or a sequence of pictures as that used for binary tree partitioning.

In some implementations (e.g., embodiments 3 and 4), additional modifications can be performed to method 1800. For example, the EQT partitioning process includes partitioning a given block into exactly four sub-blocks, at least one of which has a size different from half of a width of the given block times half of a height of the given block; wherein the BT partitioning process includes partitioning a given block into exactly two sub-blocks; and wherein the coded representation is configured to include a first field indicative of partitioning of the current block between the EQT partitioning or the BT partitioning process, and a second field indicative of a splitting direction for the current block between horizontal and vertical directions. Alternatively, the EQT partitioning process includes partitioning a given block into exactly two sub-blocks, at least one of which has a size different from half of a width of the given block times half of a height of the given block; wherein the BT partitioning process includes partitioning a given block into exactly two sub-blocks; wherein the coded representation is configured to include a first field indicative of partitioning of the current block between the EQT partitioning or the BT partitioning process, and a second field indicative of a splitting direction for the current block between horizontal and vertical directions, and wherein the first field or the second field are generated by using a context coding based at least upon a depth information of one or more neighboring blocks or a depth information of a current block.

In some implementations (e.g., embodiments 5, 6, 7(a), and 7(b)), additional modifications can be performed to method 1800. For example, the EQT partitioning process includes partitioning a given block into exactly four sub-blocks, at least one of which has a size different from half of width of the given block times half of a height of the given block; and wherein the rule allows applying the EQT partitioning process for the current block based on a width or a height of the current block. Alternatively, the EQT partitioning process includes partitioning a given block into exactly four sub-blocks, at least one of which has a size different from half of width of the given block times half of a height of the given block; and wherein the rule allows the EQT partitioning process for the current block based on a position of the current block.

Some features preferably implemented by some embodiments are now disclosed in clause-based format.

1. A method of visual media processing, comprising:
performing, based at least in part on a rule for using an extended quadtree (EQT) partitioning process, a conversion between a current block of visual media data and a corresponding coded representation of the visual media data,
wherein the EQT partitioning process includes partitioning a given block into exactly four sub-blocks, at least one of which has a size different from half of a width of the given block times half of a height of the given block; and
wherein the rule specifies that if the rule is used for partitioning the current block, then each subblock is further split in accordance with a binary tree (BT) partitioning process or a second EQT partitioning process, and further wherein, both the BT process and the second EQT partitioning process have tree depths that meet a pre-defined relationship.

2. The method of clause 1, wherein the pre-defined relationship specifies that the BT process and the second EQT partitioning process share a same maximum tree depth.

3. The method of any one or more of clauses 1-2, wherein the second EQT partitioning process partitions the current block into one of only two possible partitionings.

4. The method of clause 3, wherein the current block comprises M×N pixels, where M and N are integers, and wherein the two possible partitions include a first partitioning comprising an M×N/4 top portion, followed by two side-by-side M/2×N/2 middle portions, followed by an M×N/4 bottom portion, or a second partitioning comprising an M/4×N left portion, two M/2×N/2 middle portions on top of each other, and one M/4×N right portion.

5. A method of visual media processing, comprising:
performing, based at least in part on a rule for using a BT partitioning process, a conversion between a current block of visual media data and a corresponding coded representation of the visual media data,
wherein the BT partitioning process includes partitioning a given block into exactly two sub-blocks; and wherein the rule specifies that if the rule is used for partitioning the current block, then each subblock is further split in accordance with another binary tree (BT) partitioning process and/or an EQT partitioning process, wherein the EQT partitioning process includes partitioning a given block into exactly four sub-blocks, at least one of which has a size different from half of a width of the given block times half of a height of the given block, and further wherein, both the BT process and the EQT partitioning process have depths that meet a pre-defined relationship.

6. The method of any one or more of clauses 1-5, wherein the pre-defined relationship specifies that BT and EQT partitions have different tree depth increment values after splitting one block into sub-blocks according to the BT and/or EQT partitions.

7. The method of any one or more of clauses 5-6, wherein the pre-defined relationship specifies that if a tree depth of the given block is less than a maximum tree depth, then a given subblock is further split in accordance with the BT partitioning process and/or the EOT partitioning process.

8. The method of clause 7, wherein the pre-defined relationship specifies that the maximum tree depth of EQT partitions is equal to a sum of the maximum tree depth of the BT partitions and the maximum tree depth of the quadtree (QT) partitions.

9. The method of clause 1, wherein the rule specifies that if the current block is partitioned using the EQT partitioning process, each resulting sub-block has a depth value two more than a depth value of the current block.

10. A method of visual media processing, comprising:
performing, based at least in part on a rule for using an extended quadtree (EQT) partitioning process, a conversion between a current block of visual media data and a corresponding coded representation of the visual media data,
wherein the EQT partitioning process includes partitioning a given block into exactly four sub-blocks, at least one of which has a size different from half of a width of the given block times half of a height of the given block; and
wherein the rule specifies that if the rule is used for partitioning the current block, then a same allowed root node size is used for all blocks in a tile or a slice or a picture or a sequence of pictures as that used for binary tree partitioning.

11. The method of clause 10, wherein the rule further specifies to use a different allowed root node size for all blocks in a tile or a slice or a picture or a sequence of pictures as an allowed root node size used for binary tree partitioning.

12. The method of clause 10, wherein the allowed root node size is a maximum root node size, and wherein the coded representation is configured to indicate a maximum allowed root node size for the EQT partitioning process at a video level, or sequence level or picture level or picture header level or slice header level or tile group header level or tile level or coding tree unit level.

13. The method of clause 10, wherein the rule further specifies a maximum size of the EQT partitioning process.

14. The method of clause 13, wherein the maximum size of the EQT partitioning process is 32.

15. The method of clause 13, wherein the maximum size of the EQT partitioning process is 64.

16. A method of visual media processing, comprising:
performing, based at least in part on a rule for using an EQT partitioning process or a BT partitioning process, a conversion between a current block of visual media data and a corresponding coded representation of the visual media data, wherein the EQT partitioning process includes partitioning a given block into exactly four sub-blocks, at least one of which has a size different from half of a width of the given block times half of a height of the given block;

wherein the BT partitioning process includes partitioning a given block into exactly two sub-blocks; and wherein the coded representation is configured to include a first field indicative of partitioning of the current block between the EQT partitioning or the BT partitioning process, and a second field indicative of a splitting direction for the current block between horizontal and vertical directions.

17. The method of clause 16, wherein the coded representation includes a partition splitting pattern table as shown below:

| Bin index | Bin String | | | | Partition types |
| --- | --- | --- | --- | --- | --- |
| | 0 | 1 | 2 | 3 | |
| value | 1 | — | — | — | Quad-Tree |
| value | 0 | 0 | — | — | Non-QT Split |
| value | 0 | 1 | 0 | 0 | Horizontal BT |
| value | 0 | 1 | 0 | 1 | Vertical BT |
| value | 0 | 1 | 1 | 0 | Horizontal EQT (marked as EQT_CEN_HOR) |
| value | 0 | 1 | 1 | 1 | Vertical EQT (marked as EQT_CEN_VER) |
| Meaning of a bin value | 1: QT 0: non-QT | 0: non-split 1: split with BT or EQT | 0: BT 1: EQT | 0: split in horizontal direction 1: split in vertical direction | |

18. The method of clause 16, wherein the coded representation is configured to include a third field indicative of partitioning of the current block between one of: enabling an EQT/BT partitioning process or a lack of further splitting, and wherein the third field is signaled prior to signaling the first field and the second field.

19. The method of clause 18, further comprising:
upon determining that the third field indicates the lack of further splitting, disabling a signaling of the first field and the second field in the coded representation.

20. The method of clause 18, further comprising:
upon determining that the third field indicates enabling the EQT/BT partitioning process, signaling the first field and the second field in the coded representation.

21. The method of clause 16, wherein the coded representation is configured to include a fourth field indicative of partitioning of the current block among one of: a QT partitioning process or a non-QT partitioning process, and wherein the fourth field is signaled prior to signaling the first field and the second field.

22. The method of clause 16, further comprising:
upon determining that the fourth field indicates a use of the QT partitioning process, disabling a signaling of the first field and the second field in the coded representation.

23. The method of any one or more of clauses 21 and 22, wherein the fourth field is signaled prior to signaling the third field.

24. The method of clause 21, further comprising:
upon determining that the fourth field indicates a use of the QT partitioning process, disabling a signaling of the third field in the coded representation.

25. The method of clause 21, further comprising:
upon determining that the fourth field indicates a use of the non-QT partitioning process, signaling the third field in the coded representation.

26. The method of clause 16, wherein the first field is signaled prior to signaling the second field and the third field.

27. The method of clause 16, wherein if the first field indicates that the EQT partitioning process is applied to the current video block, then the second field is signaled to indicate which of a horizontal EQT or a vertical EQT is applied.

28. The method of clause 27, wherein the horizontal EQT splits one block of size W×H into a first set of two blocks each of size W/4×H and a second set of two blocks each of size W/2×H/2.

29. The method of clause 27, wherein the vertical EQT splits one block of size W×H into a first set of two blocks each of size W×H/4 and a second set of two blocks each of size W/2×H/2.

30. A method of visual media processing, comprising:
performing, based at least in part on a rule for using a EQT partitioning process or a BT partitioning process, a conversion between a current block of visual media data and a corresponding coded representation of the visual media data, wherein the EQT partitioning process includes partitioning a given block into exactly two sub-blocks, at least one of which has a size different from half of a width of the given block times half of a height of the given block;

wherein the BT partitioning process includes partitioning a given block into exactly two sub-blocks;

wherein the coded representation is configured to include a first field indicative of partitioning of the current block between the EQT partitioning or the BT partitioning process, and a second field indicative of a splitting direction for the current block between horizontal and vertical directions, and wherein the first field or the second field are generated by using a context coding based at least upon a depth information of one or more neighboring blocks or a depth information of a current block.

31. The method of clause 30, wherein, relative to the current block, the one or more neighboring blocks is a block spatially above or a block spatially left.

32. The method of any one or more of clauses 30-31, wherein the depth information of the one or more neighboring blocks or the depth information of the current block corresponds to a depth of the QT partitioning process, a depth of the BT partitioning process, or a depth of a quad-tree partitioning process associated with the rule.

33. The method of any one or more of clauses 30 to 32, wherein a quantized value of the depth information of the one or more neighboring blocks or the depth information of the current block is used for the context coding.

34. The method of any one or more of clauses 30 to 32, wherein the rule specifies that if the rule is used for partitioning the current block, then each subblock is further split in accordance with another binary tree (BT) partitioning process and/or another EQT partitioning process.

35. A method of visual media processing, comprising:
performing, using a rule for using an extended quadtree (EQT) partitioning process, a conversion between a current block of visual media data and a corresponding coded representation of the visual media data, wherein the EQT partitioning process includes partitioning a given block into exactly four sub-blocks, at least one of which has a size different from half of width of the given block times half of a height of the given block; and wherein the rule allows applying the EQT partitioning process for the current block based on a width or a height of the current block.

36. The method of clause 35, wherein the rule disallows the EQT partitioning process when the width of the current block is greater than or equal to T1, or the height of the current block is greater than or equal to T2, and wherein T1 and T2 are integers.

37. The method of clause 35, wherein the rule disallows the EQT partitioning process when the height of the current block is greater than or equal to T1, and the width of the current block is greater than or equal to T2, and wherein T1 and T2 are integers.

38. The method of any one or more of clauses 35 to 37, wherein the rule specifies disallowing the EQT partitioning when the width of the current block is less than or equal to T1, or the height of the current block is less than or equal to T2, and wherein T1 and T2 are integers.

39. The method of any one or more of clauses 35 to 37, wherein the rule specifies disallowing the EQT partitioning when the height of the current block is less than or equal to T1, or the width of the current block is less than or equal to T2, and wherein T1 and T2 are integers.

40. The method of any one or more of clauses 35 to 37, wherein the rule specifies disallowing a horizontal EQT partitioning when the width of the current block is greater than or equal to T1, wherein the horizontal EQT partitioning splits one block of size W×H into a first set of two blocks each of size W/4×H and a second set of two blocks each of size W/2×H/2.

41. The method of any one or more of clauses 35 to 37, wherein the rule specifies disallowing a horizontal EQT partitioning when the height of the current block is greater than or equal to T1, wherein the horizontal EQT partitioning splits one block of size W×H into a first set of two blocks each of size W/4×H and a second set of two blocks each of size W/2×H/2.

42. The method of any one or more of clauses 35 to 37, wherein the rule specifies disallowing a vertical EQT partitioning when the width of the current block is less than T1, wherein the vertical EQT partitioning splits one block of size W×H into a first set of two blocks each of size W×H/4 and a second set of two blocks each of size W/2×H/2.

43. The method of any one or more of clauses 35 to 37, wherein the rule specifies disallowing a vertical EQT partitioning when the height of the current block is less than T1, wherein the vertical EQT partitioning splits one block of size W×H into a first set of two blocks each of size W×H/4 and a second set of two blocks each of size W/2×H/2.

44. The method of any one or more of clauses 35 to 39, wherein the rule specifies disallowing the EQT partitioning when at least one of the four sub-blocks has a width or a height equal to K, and wherein, during the conversion, an application of a K×K transform is unsupported.

45. The method of any one or more of clauses 35 to 44, wherein the rule specifies allowing or disallowing the EQT partitioning conditionally based on sub-block sizes.

46. The method of any one or more of clauses F2 to F11, wherein T1 and/or T2 are pre-defined quantities.

47. The method of any one or more of clauses F2 to F11, wherein the coded representation is configured to include an indication of T1 and/or T2.

48. The method of clause 47, wherein the indication of T1 and/or T2 is included at a video level, a sequence level, a picture level, a slice header level, a tile group header level, a tile level, or a coding tree unit level.

49. A method of visual media processing, comprising:
performing, using a rule for using an extended quadtree (EQT) partitioning process, a conversion between a current block of visual media data and a corresponding bitstream representation of the visual media data,
wherein the EQT partitioning process includes partitioning a given block into exactly four sub-blocks, at least one of which has a size different from half of width of the given block times half of a height of the given block; and
wherein the rule allows the EQT partitioning process for the current block based on a position of the current block.

50. The method of clause 49, wherein the rule disallows the EQT partitioning process for the current block that exceeds a bottom border of a video region.

51. The method of any one or more of clauses 49 to 50, wherein the rule disallows the EQT partitioning process for the current block that is at a right border of a video region.

52. The method of any one or more of clauses 49 to 50, wherein the rule disallows the EQT partitioning process for the current block that is at a corner of a video region.

53. The method of clause 52, wherein the corner corresponds to a bottom right corner of the video region.

54. The method of clause 49, wherein the rule allows use of a horizontal EQT partitioning or a horizontal binary tree partitioning of the current block when the current block is at a bottom border of a video region.

55. The method of clause 49, wherein the rule allows use of a horizontal EQT partitioning or a horizontal binary tree partitioning of the current block when the current block is at a right border of a video region.

56. The method of any one or more of clauses 50 to 54, wherein the video region is a picture including the current block.

57. A method of visual media processing, comprising:
performing, using a rule for using an extended quadtree (EQT) partitioning process, a conversion between a current block of visual media data and a corresponding coded representation of the visual media data,
wherein the EQT partitioning process includes partitioning a given block into exactly four sub-blocks, at least one of which has a size different from half of width of the given block times half of a height of the given block; and
wherein, if the rule disallows the EQT partitioning process for the current block, then corresponding syntax elements associated with the EQT partitioning process are omitted from the coded representation.

58. A method of visual media processing, comprising:
performing, using a rule for using an extended quadtree (EQT) partitioning process, a conversion between a current block of visual media data and a corresponding coded representation of the block,
wherein the EQT partitioning process includes partitioning a given block into exactly four sub-blocks, at least one of which has a size different from half of width of the given block times half of a height of the given block; and
wherein, regardless if the rule allows or disallows the EQT partitioning process for the current block, then corresponding syntax elements associated with the EQT partitioning process are signaled in the coded representation.

59. The method of clause 58, further comprising:
upon determining that the EQT partitioning process is disallowed, using the syntax elements to signal that the EQT partitioning process is not applied.

60. A video processing apparatus comprising a processor configured to implement a method recited in any one or more of clauses 1 to 59.

61. The apparatus of clause 60, wherein the apparatus is a video encoder.

62. The apparatus of clause 60, wherein the apparatus is a video decoder.

63. A computer readable media, a program comprising code for a processor to carry out a method recited in any one or more of clauses 1 to 59.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a current video block of a visual media data and a bitstream of the visual media data, whether an extended quad tree (EQT) partitioning process is applied to the current video block according to a rule; and
   performing the conversion based on the determining;
   wherein the EQT partitioning process splits the current video block into exactly four sub-blocks in response to the EQT partitioning process is applied to the current video block, wherein the four sub-blocks including at least one sub-block that has a dimension different from half of a width of the current video block times half of a height of the current video block, a first sub-block and a second sub-block of the four sub-blocks have a first dimension, a third sub-block and a fourth sub-block of the four sub-blocks have a second dimension,
   and wherein the rule specific that the EQT partitioning process is not applied to the current video block in a case that the current video block exceeds a border of a video region.

2. The method of claim 1, wherein the rule specific that the EQT partitioning process is not applied to the current video block in a case that the current video block exceeds a bottom border of the video region.

3. The method of claim 1, wherein the rule specific that the EQT partitioning process is not applied to the current video block in a case that the current video block exceeds a right border of the video region.

4. The method of claim 1, wherein the rule specific that the EQT partitioning process is not applied to the current video block in a case that the current video block exceeds a bottom-right corner border of the video region.

5. The method of claim 1, wherein a height (H) and a width (W) of the current video block are integers, and the first dimension is H/4×W, the second dimension is H/2×W/2,
   and wherein the EQT partitioning process is not applied to the current video block in a case that the current video block exceeds a bottom border, a right border or a bottom-right corner border of the video region.

6. The method of claim 1, wherein a height (H) and a width (W) of the current video block are integers, and the first dimension is H×W/4, the second dimension is H/2×W/2,
   and wherein the EQT partitioning process is not applied to the current video block in a case that the current video block exceeds a bottom border, a right border or a bottom-right corner border of the video region.

7. The method of claim 1, wherein the video region is a picture including the current video block.

8. The method of claim 1, wherein the rule further specific that the EQT partitioning process is not applied to the current video block in a case that split times of the current video block is greater than a predetermined value.

9. The method of claim 1, wherein a maximumly allowed root node size of the EQT partitioning process is different from a maximumly allowed root node size of a binary tree (BT) partitioning process.

10. The method of claim 1, wherein a maximumly allowed root node size of the EQT partitioning process is 32.

11. The method of claim 1, wherein a maximumly allowed root node size of the EQT partitioning process is 64.

12. The method of claim 1, wherein a maximumly allowed root node size of the EQT partitioning process is derived based on a first value, and the first value is indicated at a sequence level.

13. The method of claim 1, wherein syntax elements associated with the EQT partitioning process are omitted from the bitstream in a case that the EQT partitioning process is not allowed for the current video block, and wherein the EQT partitioning process includes one or more kinds of partitioning process.

14. The method of claim 1, wherein a height (H) and a width (W) of the current video block are integers, and the one or more kinds of partitioning process includes at least one of a first kind of partitioning process and a second kind of partitioning process,
   wherein in the first kind of partitioning process, the first dimension is H/4×W, the second dimension is H/2×W/2,
   and wherein in the second kind of partitioning process, the first dimension is H×W/4, the second dimension is H/2×W/2.

15. The method of claim 1, wherein a height (H) and a width (W) of the current video block are integers, wherein a top-left coordinate of the current video block is denoted (x, y), and wherein the four sub-blocks have top-left coordinates and dimensions given as:
   (i) top-left coordinate (x, y) with dimensions H/4×W;
   (ii) top-left coordinate (x, y+H/4) with dimensions H/2×W/2;
   (iii) top-left coordinate (x+W/2, y+H/4) with dimensions H/2×W/2; and
   (iv) top-left coordinate (x, y+3×H/4) with dimensions H/4×W.

16. The method of claim 1, wherein a height (H) and a width (W) of the current video block are integers, wherein a top-left coordinate of the current video block is denoted (x, y), and wherein the four sub-blocks have top-left coordinates and dimensions given as:
   (i) top-left coordinate (x, y) with dimensions H×W/4;
   (ii) top-left coordinate (x+W/4, y) with dimensions H/2×W/2;
   (iii) top-left coordinate (x+W/4, y+H/2) with dimensions H/2×W/2; and
   (iv) top-left coordinate (x+3×W/4, y) with dimensions H×W/4.

17. The method of claim 1, in response to the EQT partitioning process is applied to the current video block, the method further comprising:
   applying to at least one of the four sub-blocks, at least one of a binary tree (BT) partitioning process, a ternary tree (TT) partitioning process, a quad tree (QT) partitioning process or the EQT partitioning process;
   wherein the BT partitioning process splits the at least one of the four sub-blocks into two equally sized sub-blocks, wherein the QT partitioning process splits the at least one of the four sub-blocks into four equally sized sub-blocks, and wherein the TT partitioning process splits the at least one of the four sub-blocks into three sub-blocks.

18. An apparatus for processing video data comprising a processor and a non-transitory memory with instructions thereon, wherein the instructions upon execution by the processor, cause the processor to:
   determine, for a conversion between a current video block of a visual media data and a bitstream of the visual media data, whether an extended quad tree (EQT) partitioning process is applied to the current video block according to a rule; and
   perform the conversion based on the determination;
   wherein the EQT partitioning process splits the current video block into exactly four sub-blocks in response to the EQT partitioning process is applied to the current video block, wherein the four sub-blocks including at least one sub-block that has a dimension different from half of a width of the current video block times half of a height of the current video block, a first sub-block and a second sub-block of the four sub-blocks have a first dimension, a third sub-block and a fourth sub-block of the four sub-blocks have a second dimension, and wherein the rule specific that the EQT partitioning process is not applied to the current video block in a case that the current video block exceeds a border of a video region.

19. A non-transitory computer-readable storage medium storing instructions that cause a processor to:

determine, for a conversion between a current video block of a visual media data and a bitstream of the visual media data, whether an extended quad tree (EQT) partitioning process is applied to the current video block according to a rule; and perform the conversion based on the determination;

wherein the EQT partitioning process splits the current video block into exactly four sub-blocks in response to the EQT partitioning process is applied to the current video block, wherein the four sub-blocks including at least one sub-block that has a dimension different from half of a width of the current video block times half of a height of the current video block, a first sub-block and a second sub-block of the four sub-blocks have a first dimension, a third sub-block and a fourth sub-block of the four sub-blocks have a second dimension, and wherein the rule specific that the EQT partitioning process is not applied to the current video block in a case that the current video block exceeds a border of a video region.

20. A non-transitory computer-readable recording medium storing a bitstream of a visual media data which is generated by a method performed by a video processing apparatus, wherein the method comprises:

determining, whether an extended quad tree (EQT) partitioning process is applied to a current video block of the visual media data according to a rule; and generating the bitstream based on the determining;

wherein the EQT partitioning process splits the current video block into exactly four sub-blocks in response to the EQT partitioning process is applied to the current video block, wherein the four sub-blocks including at least one sub-block that has a dimension different from half of a width of the current video block times half of a height of the current video block, a first sub-block and a second sub-block of the four sub-blocks have a first dimension, a third sub-block and a fourth sub-block of the four sub-blocks have a second dimension, and wherein the rule specific that the EQT partitioning process is not applied to the current video block in a case that the current video block exceeds a border of a video region.

* * * * *